US012637882B2

(12) United States Patent
Judah et al.

(10) Patent No.: US 12,637,882 B2
(45) Date of Patent: May 26, 2026

(54) LATCH SYSTEM WITH ACTUATOR, POSITION SENSOR, OR ACTUATOR AND POSITION SENSOR

(71) Applicant: Southco, Inc., Concordville, PA (US)

(72) Inventors: David Gray Judah, Concordville, PA (US); Gregory Gilbert Garneau, Concordville, PA (US)

(73) Assignee: Southco, Inc., Concordville, PA (US)

( * ) Notice: Subject to any disclaimer, the term of this patent is extended or adjusted under 35 U.S.C. 154(b) by 69 days.

(21) Appl. No.: 18/554,357

(22) PCT Filed: Apr. 7, 2022

(86) PCT No.: PCT/US2022/023760
§ 371 (c)(1),
(2) Date: Oct. 6, 2023

(87) PCT Pub. No.: WO2022/216889
PCT Pub. Date: Oct. 13, 2022

(65) Prior Publication Data

US 2024/0209656 A1 Jun. 27, 2024

Related U.S. Application Data

(60) Provisional application No. 63/172,476, filed on Apr. 8, 2021.

(51) Int. Cl.
*E05B 81/14* (2014.01)
*E05B 81/24* (2014.01)
(Continued)

(52) U.S. Cl.
CPC .............. *E05B 81/14* (2013.01); *E05B 81/25* (2013.01); *E05B 81/28* (2013.01); *E05B 81/66* (2013.01);
(Continued)

(58) Field of Classification Search
CPC .......... E05B 81/14; E05B 81/16; E05B 81/26; E05B 81/28; E05B 81/42; E05B 81/46;
(Continued)

(56) References Cited

U.S. PATENT DOCUMENTS 3,347,584 A * 10/1967 Johnstone ............... E05B 85/26 292/216
3,386,761 A * 6/1968 Johnstone ............... E05B 77/48 292/216
(Continued)

FOREIGN PATENT DOCUMENTS

CN 108412328 A 8/2018
CN 109441253 A 3/2019
(Continued)

OTHER PUBLICATIONS

Computer Generated Translation for EP 231042, Generated on Jan. 23, 2025 (Year: 2025).*
(Continued)

*Primary Examiner* — Alyson M Merlino
(74) *Attorney, Agent, or Firm* — Buchanan Ingersoll & Rooney PC

(57) ABSTRACT

A latch system for capturing a striker, the latch system comprising an actuator, a position sensor, or a combination thereof is disclosed. The latch system includes a latch having a latch cam and a trigger; an actuator having a connector and a motor; and a sensor assembly having a sensing arm and a sensor. The latch cam of the latch is configured to capture the striker when in a closed position. The latch cam is retained in the closed position when the trigger of the latch is in the locked position. The trigger of the latch is moved from an unlocked position toward the locked position by the connector of the actuator when it is moved by the motor from the unlocking position toward the locking position. The sensing arm contacts the striker when the striker is captured
(Continued)

by the latch system. The sensor is deactivated when the sensing arm is in one of the latched position or the unlatched position and activated when the sensing arm is in the other one of the latched position or the unlatched position.

38 Claims, 37 Drawing Sheets

(51) Int. Cl.
*E05B 81/28* (2014.01)
*E05B 81/66* (2014.01)
*E05B 81/90* (2014.01)
*E05B 85/24* (2014.01)
*E05B 85/26* (2014.01)

(52) U.S. Cl.
CPC ............ *E05B 81/90* (2013.01); *E05B 85/245* (2013.01); *E05B 85/26* (2013.01)

(58) Field of Classification Search
CPC .......... E05B 81/90; E05B 81/64; E05B 81/66; E05B 81/68; E05B 81/70; E05B 85/245
See application file for complete search history.

(56) References Cited

U.S. PATENT DOCUMENTS

| | | | | |
|---|---|---|---|---|
| 3,504,511 | A * | 4/1970 | Allen | E05B 83/16 292/216 |
| 3,666,305 | A | 5/1972 | Schlichter | |
| 4,252,351 | A * | 2/1981 | Yoshino | E05B 81/16 292/201 |
| 4,422,522 | A * | 12/1983 | Slavin | E05B 77/12 292/DIG. 43 |
| 4,971,370 | A * | 11/1990 | Detweiler | E05B 81/14 292/DIG. 43 |
| 5,382,763 | A * | 1/1995 | Martus | E05B 81/14 200/283 |
| 5,785,364 | A * | 7/1998 | Kleefeldt | E05B 85/243 292/201 |
| 6,435,573 | B1 * | 8/2002 | Szablewski | E05B 81/14 292/216 |
| 8,496,275 | B2 * | 7/2013 | Garneau | E05B 47/0012 292/201 |
| 9,290,969 | B2 * | 3/2016 | Yokota | E05B 85/02 |
| 9,714,532 | B2 * | 7/2017 | Peatey | E05B 81/68 |
| 10,577,842 | B2 * | 3/2020 | Farris | E05B 85/26 |
| 11,525,289 | B2 * | 12/2022 | Cumbo | E05B 85/243 |
| 11,536,061 | B2 * | 12/2022 | Sturm | E05B 85/243 |
| 12,196,002 | B2 * | 1/2025 | Weinerman | E05B 47/0012 |
| 2004/0113441 | A1 | 6/2004 | Lane et al. | |
| 2008/0087054 | A1 * | 4/2008 | Hoffmann | E05B 47/0607 70/101 |
| 2015/0145263 | A1 * | 5/2015 | Farris | E05B 85/26 292/195 |
| 2015/0145265 | A1 | 5/2015 | Weinerman et al. | |
| 2016/0130840 | A1 | 5/2016 | Garneau | |
| 2016/0215532 | A1 | 7/2016 | Farrenkothen | |
| 2016/0251879 | A1 | 9/2016 | Behnke | |
| 2020/0190857 | A1 | 6/2020 | Liu et al. | |
| 2021/0293059 | A1 * | 9/2021 | Strole | E05B 81/20 |

FOREIGN PATENT DOCUMENTS

| | | | | |
|---|---|---|---|---|
| DE | 2326808 | A1 * | 12/1973 | |
| DE | 3829288 | A * | 4/1989 | E05B 81/14 |
| DE | 4421879 | A1 * | 1/1996 | E05B 77/28 |
| DE | 19627076 | C1 * | 9/1997 | E05B 81/14 |
| DE | 29915090 | U1 * | 1/2001 | E05B 81/14 |
| DE | 102016117282 | A1 * | 3/2018 | E05B 77/16 |
| DE | 102019003618 | A1 | 12/2019 | |
| DE | 102019110702 | A1 * | 10/2020 | E05B 81/66 |
| EP | 106725 | A * | 4/1984 | E05B 81/14 |
| EP | 159238 | A * | 10/1985 | E05B 81/14 |
| EP | 231042 | A * | 8/1987 | E05B 81/06 |
| EP | 0398047 | A1 | 11/1990 | |
| EP | 0475037 | A1 * | 3/1992 | |
| EP | 0976902 | A1 * | 2/2000 | |
| EP | 3412853 | A1 | 12/2018 | |
| FR | 2973057 | A1 | 9/2012 | |
| JP | 2000314256 | A * | 11/2000 | E05B 81/66 |
| JP | 2013014938 | A * | 1/2013 | |
| KR | 100276106 | B1 * | 2/2001 | |
| WO | 2008064234 | A2 | 5/2008 | |
| WO | 2011116147 | A2 | 9/2011 | |

OTHER PUBLICATIONS

Computer Generated Translation for DE 102016117282, Generated on Jan. 23, 2025 (Year: 2025).*
Computer Generated Translation for JP 2013014938, Generated on Jan. 23, 2025 (Year: 2025).*
International Preliminary Report on Patentability for International Application No. PCT/US2022/023760, dated Oct. 10, 2023, 14 pages.
International Search Report and Written Opinion for International Application No. PCT/US2022/023760, dated Nov. 17, 2022, 18 pages.
Office Action (The First Office Action) issued Nov. 19, 2025, by the State Intellectual Property Office of People's Republic of China in corresponding Chinese Patent Application No. 202280040962.2 and an English translation of the Office Action. (24 pages).

* cited by examiner

LATCH SYSTEM WITH ACTUATOR, POSITION SENSOR, OR ACTUATOR AND POSITION SENSOR

CROSS REFERENCE TO RELATED APPLICATIONS

This application is a U.S. National Phase of PCT International Application No. PCT/US2022/023760, filed Apr. 7, 2022, which claims priority to U.S. Provisional Patent Application No. 63/172,476, filed on Apr. 8, 2021, titled "LATCH SYSTEM WITH ACTUATOR, POSITION SENSOR, OR ACTUATOR AND POSITION SENSOR," both of which are incorporated by reference herein in their entireties for all purposes.

FIELD OF THE INVENTION

The present invention relates to the field of latch assemblies.

BACKGROUND OF THE INVENTION

Latch systems are relied on in many applications for securing items such as panels, doors, and doorframes together. For example, containers, cabinets, closets, drawers, compartments and the like may be secured with a latch. One type of latch system includes a rotary pawl or cam, which remains open until the pawl or cam impinges on a bolt or striker. The relative displacement of the system with respect to the bolt causes the rotary pawl or cam to rotate and capture the bolt.

In many applications an electrically operated latch is desirable due to the need for remote or push-button entry, coded access, key-less access, or monitoring of access. Various latches for panel closures have been employed where one of the panels, such as a swinging door, drawer or the like, is to be fastened or secured to a stationary panel, doorframe, cabinet, or compartment body.

There is therefore a need for new rotary pawl or cam latch systems that include the option of electrical operation yet meet needs of users in terms of at least one of cost, performance, reliability, and durability.

SUMMARY OF THE INVENTION

One aspect of the present invention provides a latch system for capturing a striker. The latch system comprises a latch having a latch cam and a trigger. The latch cam is mounted to rotate between a closed position and an open position. The latch cam is configured to capture the striker when in the closed position. The trigger is mounted to rotate between a locked position and an unlocked position. When the trigger is in the locked position, the trigger is positioned to contact the latch cam, thereby retaining the latch cam in the closed position. The latch system further comprises an actuator having a connector and a motor. The connector is positionable to engage the trigger and is movable between a locking position and an unlocking position. The motor is coupled to the connector and is configured to move the connector between the locking position and the unlocking position. The trigger of the latch is moved from the locked position toward the unlocked position by the connector when the connector of the actuator is moved by the motor from the locking position toward the unlocking position. Further, the trigger of the latch is moveable relative to the connector of the actuator from the locked position toward the unlocked position when the connector of the actuator remains in the locking position, thereby permitting the latch cam of the latch to rotate from the closed position toward the open position when the connector of the actuator remains in the locking position.

In another aspect of the invention, a latch system for capturing a striker comprises a latch having a striker-receiving recess and a sensor assembly mounted to the latch. The sensor assembly includes a sensing arm and a sensor mounted adjacent to the sensor arm. The sensing arm is mounted for rotation about a rotation axis. Further, the sensing arm has a striker contact surface extending radially outwardly relative to the rotation axis and facing toward the striker-receiving recess of the latch. The sensing arm is also positioned for contact with the striker when the striker is captured by the latch system. In addition, the sensing arm also includes a sensor contact surface extending radially outwardly relative to the rotation axis and angled relative to the striker contact surface. The sensing arm has a latched position when the striker contact surface of the sensing arm contacts the striker and an unlatched position when the striker contact surface of the sensing arm is not in contact with the striker. Regarding the sensor, the sensor includes a button movable between an actuated position in which the sensor is actuated and an unactuated position in which the sensor is not actuated. The sensing arm of the sensor assembly is moved about the rotation axis from the unlatched position to the latched position by the striker when the striker contact surface of the sensing arm contacts the striker. The sensor contact surface of the sensing arm maintains the button of the sensor in the unactuated position when the sensing arm is in one of the latched position or the unlatched position. The sensor contact surface of the sensing arm allows movement of the button of the sensor toward the actuated position when the sensing arm is in the other one of the latched position or the unlatched position.

In yet another aspect of the present invention, a latch system for capturing a striker comprises a latch, an actuator, and a sensor assembly mounted to the latch. The latch has a striker-receiving recess, a latch cam, and a trigger. The latch cam is mounted to rotate between a closed position and an open position. The latch cam is configured to capture the striker when in the closed position. The trigger is mounted to rotate between a locked position and an unlocked position. When the trigger is in the locked position, the trigger is positioned to contact the latch cam, thereby retaining the latch cam in the closed position. The actuator has a connector and a motor coupled to the connector. The connector is positionable to engage the trigger and is movable between a locking position and an unlocking position. The motor is configured to move the connector between the locking position and the unlocking position. The sensor assembly includes a sensing arm and a sensor mounted adjacent the sensor arm. The sensing arm has a striker contact surface positioned for contact with the striker when the striker is captured by the latch system. The sensing arm also has a sensor contact surface. The sensing arm has a latched position when the striker contact surface of the sensing arm contacts the striker and an unlatched position when the striker contact surface of the sensing arm is not in contact with the striker. The trigger of the latch is moved from the locked position toward the unlocked position by the connector when the connector of the actuator is moved by the motor from the locking position toward the unlocking position. The trigger of the latch is also moveable relative to the connector of the actuator from the locked position toward the unlocked position when the connector of the actuator remains in the locking position, thereby permitting the latch cam of the latch to rotate from the closed position toward the open position when the connector of the actuator remains in the locking position. The sensor contact surface of the sensing arm activates the sensor when the sensing arm is in one of the latched position or the unlatched position, and the sensor contact surface of the sensing arm allows deactivation of the sensor when the sensing arm is in the other one of the latched position or the unlatched position.

DETAILED DESCRIPTION OF THE INVENTION

Figure 1A:
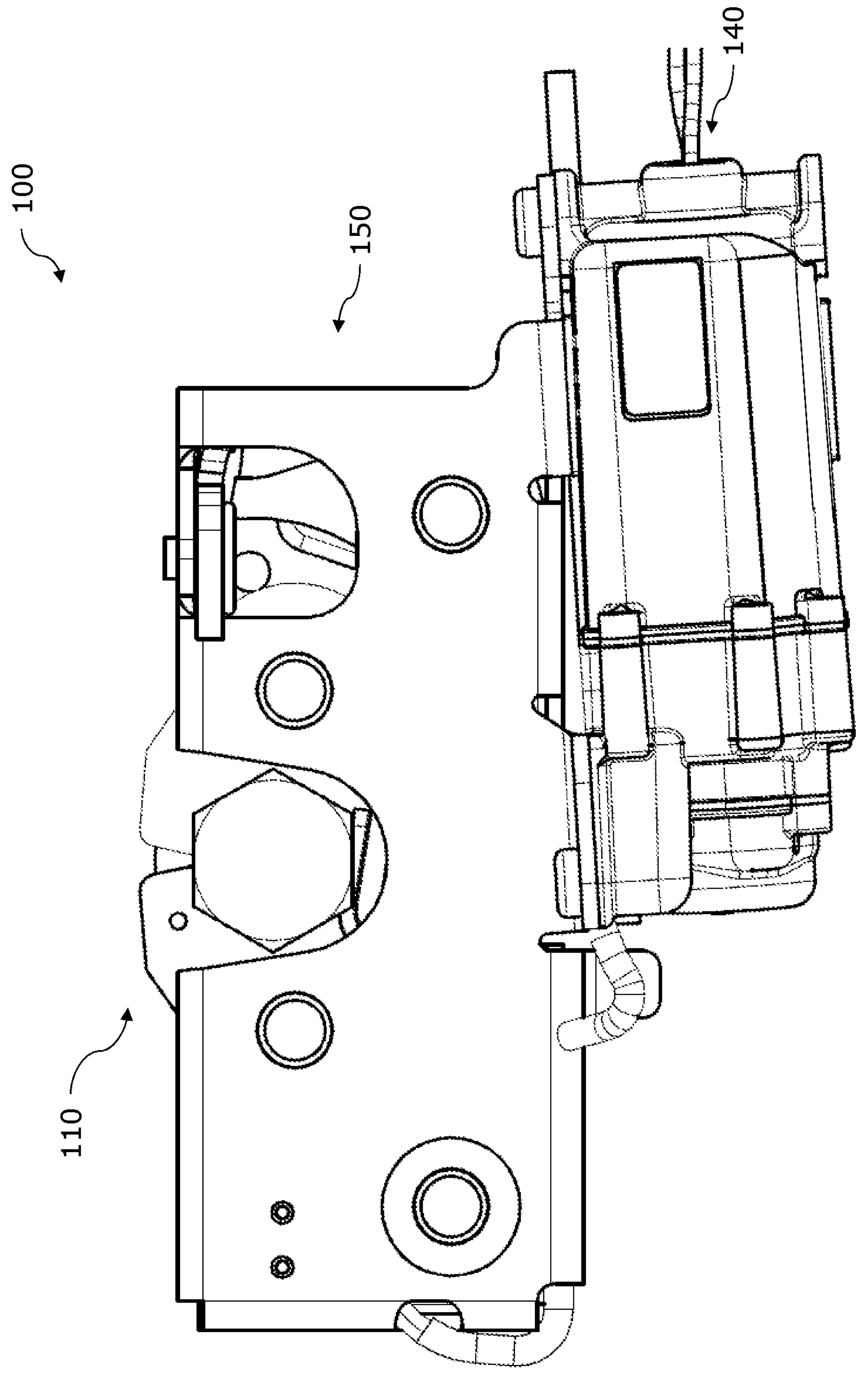
FIG. 1A is a side view of an embodiment of a latch system engaging a striker.

The invention will now be described by reference to exemplary embodiments and variations of those embodiments. Although the invention is illustrated and described herein with reference to specific embodiments, the invention is not intended to be limited to the details shown and described. Rather, various modifications may be made in the details within the scope and range of equivalents of the claims and without departing from the invention.

Generally, this invention provides a means for capturing a striker, a bolt, a catch, a keeper, or other similar component or structure capable of being captured or otherwise retained by a latch (generically referred to in this description as a striker or latch striker), and for releasing the striker by either the electrical actuation or manual actuation of a trigger.

As will be described in greater detail below, this invention makes it possible to maintain or increase the cycle life of a latch system so that it can be used repeatedly and reliably throughout many use cycles of opening and closing the latch. This makes it possible to maintain or increase the time between service of the latch or the time before replacement of one or more of the components of the latch is needed. In one non-limiting example selected for illustration, a latch system according to aspects of this invention can be used to selectively latch and unlatch a door for access to an interior of a vehicle, such as a delivery vehicle having a latchable door that secures contents of the delivery vehicle and that is opened and closed frequently by authorized personnel.

Referring generally to the figures, one aspect of the present invention provides a latch system 100 for capturing a striker 190. The latch system 100 comprises a latch 110 having a latch cam 112 and a trigger 120. The latch cam 112 is mounted to rotate between a closed position and an open position. The latch cam 112 is configured to capture the striker 190 when in the closed position.

The trigger 120 is mounted to rotate between a locked position and an unlocked position. When the trigger 120 is in the locked position, the trigger 120 is positioned to contact the latch cam 112, thereby retaining the latch cam 112 in the closed position.

The latch system 100 further comprises an actuator 140 having a connector 146 and a motor 144. The connector 146 is positionable to engage the trigger 120 and is movable between a locking position and an unlocking position. The motor 144 is coupled to the connector 146 and is configured to move the connector 146 between the locking position and the unlocking position.

The trigger 120 of the latch 110 is moved from the locked position toward the unlocked position by the connector 146 when the connector 146 of the actuator 140 is moved by the motor 144 from the locking position toward the unlocking position. Further, the trigger 120 of the latch 110 is moveable relative to the connector 146 of the actuator 140 from the locked position toward the unlocked position when the connector 146 of the actuator 140 remains in the locking position, thereby permitting the latch cam 112 of the latch 110 to rotate from the closed position toward the open position when the connector 146 of the actuator 140 remains in the locking position.

The latch 110 can have plural cams 112 each mounted to rotate between a closed position and an open position and together configured to capture the striker 190 when the latch cams 112 are in their closed positions. The latch cams 112 can together define a central region 113 into which the striker 190 can extend. The connector 146 of the actuator 140 can be aligned with the central region 113 defined by the latch cams 112, thereby maintaining a mechanical advantage as the trigger 120 of the latch 110 is moved from the locked position toward the unlocked position by the connector 146 of the actuator 140 when the connector 146 is moved by the motor 140 from the locking position toward the unlocking position, reducing actuation time, and reducing stress applied to the actuator 140.

In another aspect, the invention provides a latch system 100 with a latch 110 having a striker-receiving recess 113 and a sensor assembly 200 mounted to the latch 110. The sensor assembly 200 includes a sensor arm or sensing arm 132 and a sensor 170 mounted adjacent to the sensing arm 132. The sensing arm 132 is mounted for rotation about a rotation axis.

The sensing arm 132 has a striker contact surface 184 extending radially outwardly relative to the rotation axis and facing toward the striker-receiving recess 113 of the latch 110. The sensing arm 132 is also positioned for contact with the striker 190 when the striker 190 is captured by the latch system 100. The sensing arm 132 also includes a sensor contact surface 182 extending radially outwardly relative to the rotation axis and angled relative to the striker contact surface 184. The sensing arm 132 has a latched position when the striker contact surface 184 of the sensing arm 132 contacts the striker 190 and an unlatched position when the striker 190 contact surface of the sensing arm 132 is not in contact with the striker 190.

The sensor 170 includes a button 172 movable between an actuated position in which the sensor 170 is actuated and an unactuated position in which the sensor is not actuated. The sensing arm 132 of the sensor assembly 200 is moved about the rotation axis from the unlatched position to the latched position by the striker 190 when the striker contact surface 184 of the sensing arm 132 contacts the striker 190.

The sensor contact surface 182 of the sensing arm 132 maintains the button 172 of the sensor 170 in the unactuated position when the sensing arm 132 is in one of the latched position or the unlatched position. The sensor contact surface 182 of the sensing arm 132 allows movement of the button 172 of the sensor 170 toward the actuated position when the sensing arm 132 is in the other one of the latched position or the unlatched position.

The sensing arm 132 is interposed between the striker 190 and the sensor 170 when the striker 190 is received in the striker-receiving recess 113, thereby preventing the striker 190 from directly contacting the sensor 170 and increasing a cycle life of the sensor 170. The sensor contact surface 182 of the sensing arm 132 moves away from the button 172 as the striker 190 is captured in the striker-receiving recess 113 of the latch 110.

In yet another aspect of the present invention, a latch system 100 is provided with a latch 110, an actuator 140, and a sensor assembly 200 mounted to the latch 110. The latch 110 has a striker-receiving recess 113, a latch cam 112, and a trigger 120. The latch cam 112 is mounted to rotate between a closed position and an open position. The latch cam 112 is configured to capture the striker 190 when in the closed position. The trigger 120 is mounted to rotate between a locked position and an unlocked position. When the trigger 120 is in the locked position, the trigger 120 is positioned to contact the latch cam 112, thereby retaining the latch cam 112 in the closed position.

Regarding the actuator 140, the actuator 140 has a connector 146 and a motor 144 coupled to the connector 146. The connector 146 is positionable to engage the trigger 120 and is movable between a locking position and an unlocking position. The motor 144 is configured to move the connector 146 between the locking position and the unlocking position.

Regarding the sensor assembly 200, the sensor assembly 200 includes a sensing arm 132 and a sensor 170 mounted adjacent the sensing arm 132. The sensing arm 132 has a striker contact surface 184 positioned for contact with the striker 190 when the striker 190 is captured by the latch system 100. The sensing arm 132 also has a sensor contact surface 182. The sensing arm 132 has a latched position when the striker contact surface 184 of the sensing arm 132 contacts the striker 190 and an unlatched position when the striker contact surface 184 of the sensing arm 132 is not in contact with the striker 190.

The trigger 120 of the latch 110 is moved from the locked position toward the unlocked position by the connector 146 when the connector 146 of the actuator 140 is moved by the motor 144 from the locking position toward the unlocking position. The trigger 120 of the latch 110 is also moveable relative to the connector 146 of the actuator 140 from the locked position toward the unlocked position when the connector 146 of the actuator 140 remains in the locking position, thereby permitting the latch cam 112 of the latch 110 to rotate from the closed position toward the open position when the connector 146 of the actuator 140 remains in the locking position. The sensor contact surface 182 of the sensing arm 132 activates the sensor 170 when the sensing arm 132 is in one of the latched position or the unlatched position, and the sensor contact surface 182 of the sensing arm 132 allows deactivation of the sensor 170 when the sensing arm 132 is in the other one of the latched position or the unlatched position.

The sensor 170 is offset from a path of the striker 190 as the striker 190 enters the striker-receiving recess 113 of the latch 110. The sensing arm 132 is interposed between the striker 190 and the sensor 170 when the striker 190 is received in the striker-receiving recess 113, thereby preventing the striker 190 from directly contacting the sensor 170 and increasing a cycle life of the sensor 170.

Figure 1B:
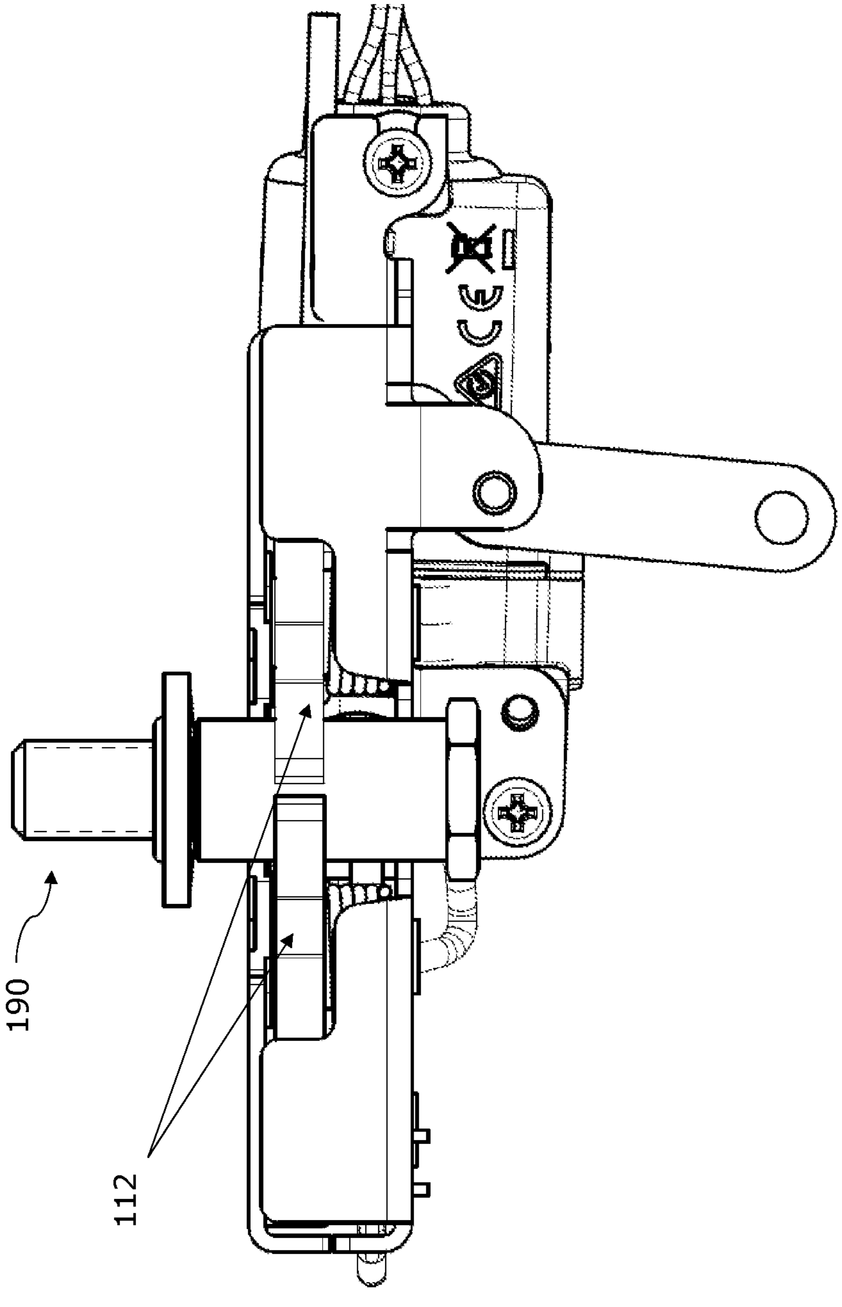
FIG. 1B is a top view of the latch system of FIG. 1A, showing the capture of a portion of the striker.

Referring now specifically to FIGS. 1A-1B, a first embodiment according to the present invention is illustrated. A latch system 100 is configured to capture a portion of a bolt or striker 190 and retain it in a fixed position, as illustrated in FIG. 1B. The latch system 100 includes components, such as a housing 150; a latch 110 including latch cams 112 and a trigger 120 (not shown in FIGS. 1A-1B); and an actuator 140 comprising a motor 144 and a connector 146 (not shown in FIGS. 1A-1B). The housing 150 is configured to partially enclose one or more components of the latch system 100. For example, the housing 150 is configured to partially enclose one or more of the trigger 120 and the latch cams 112 of the latch system 100.

Figure 5A:
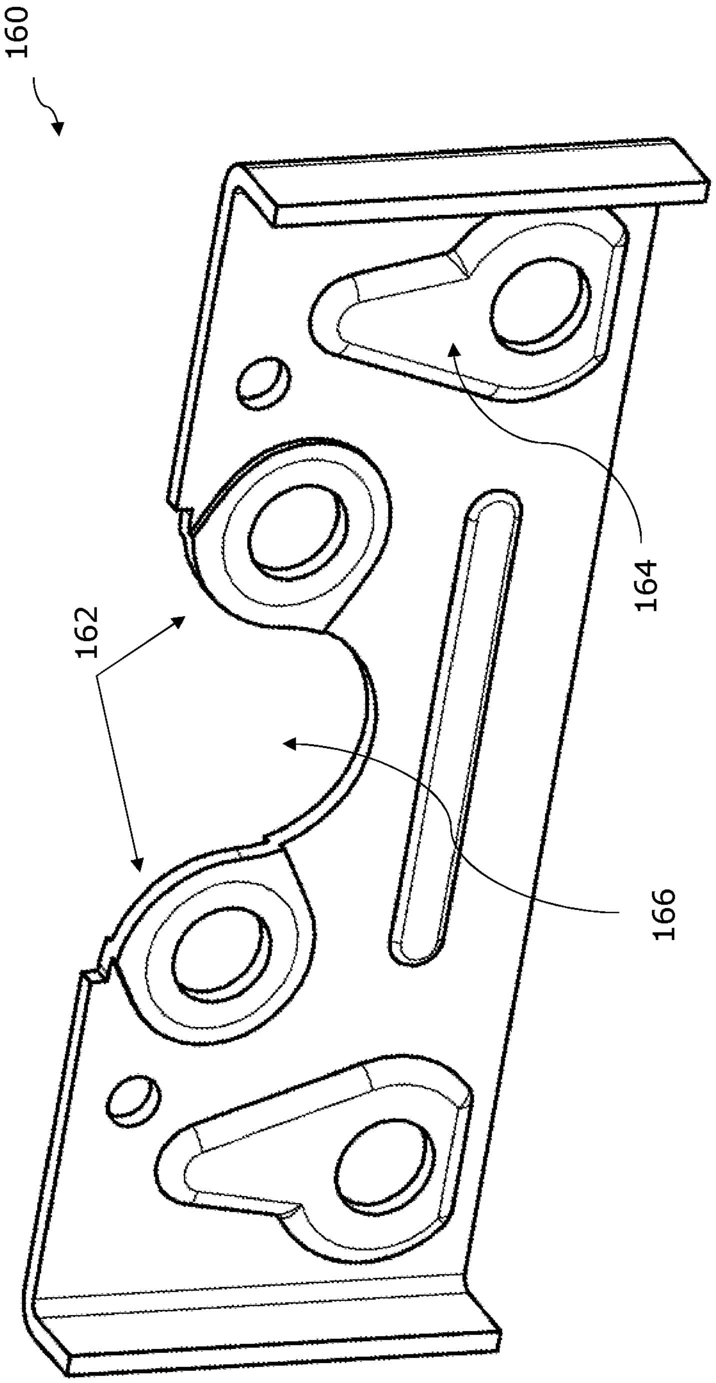
FIG. 5A is a perspective view of an embodiment of a back frame of the latch system.
Figure 5B:
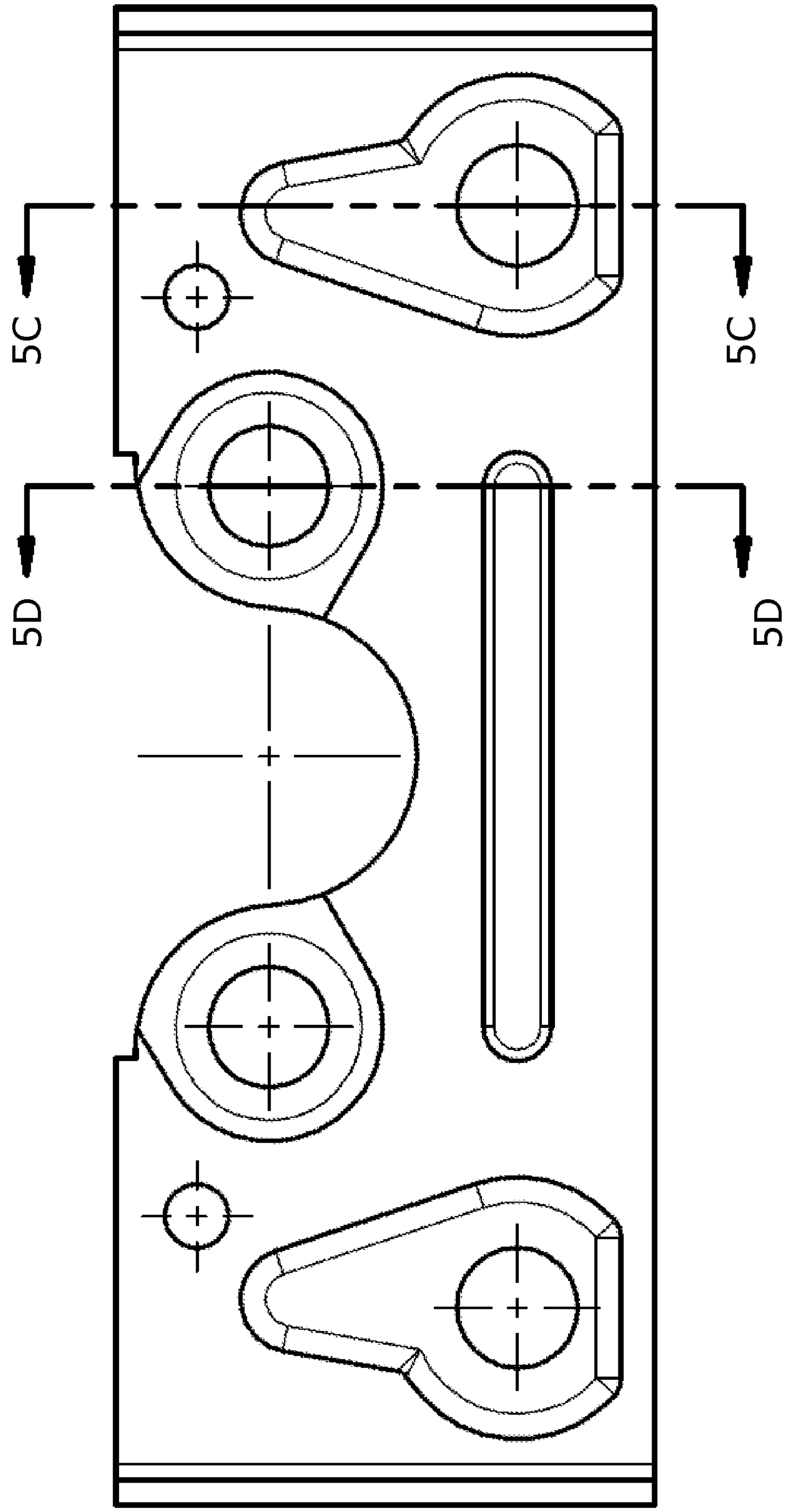
FIG. 5B is a front view of the back frame of FIG. 5A.
Figure 5E:
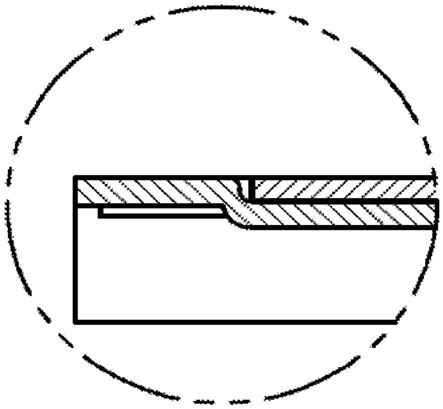
FIG. 5E is a magnified view of detail E as defined in FIG. 5C.
Figure 5D:
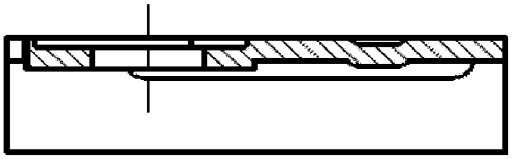
FIG. 5D is a cross-section view of another portion of the back frame, taken through line 5D-5D in FIG. 5B.
Figure 5C:
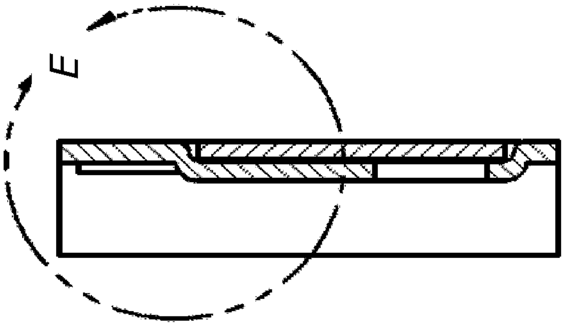
FIG. 5C is a cross-section view of a portion of the back frame of FIG. 5A, taken through line 5C-5C in FIG. 5B.
Figure 6A:
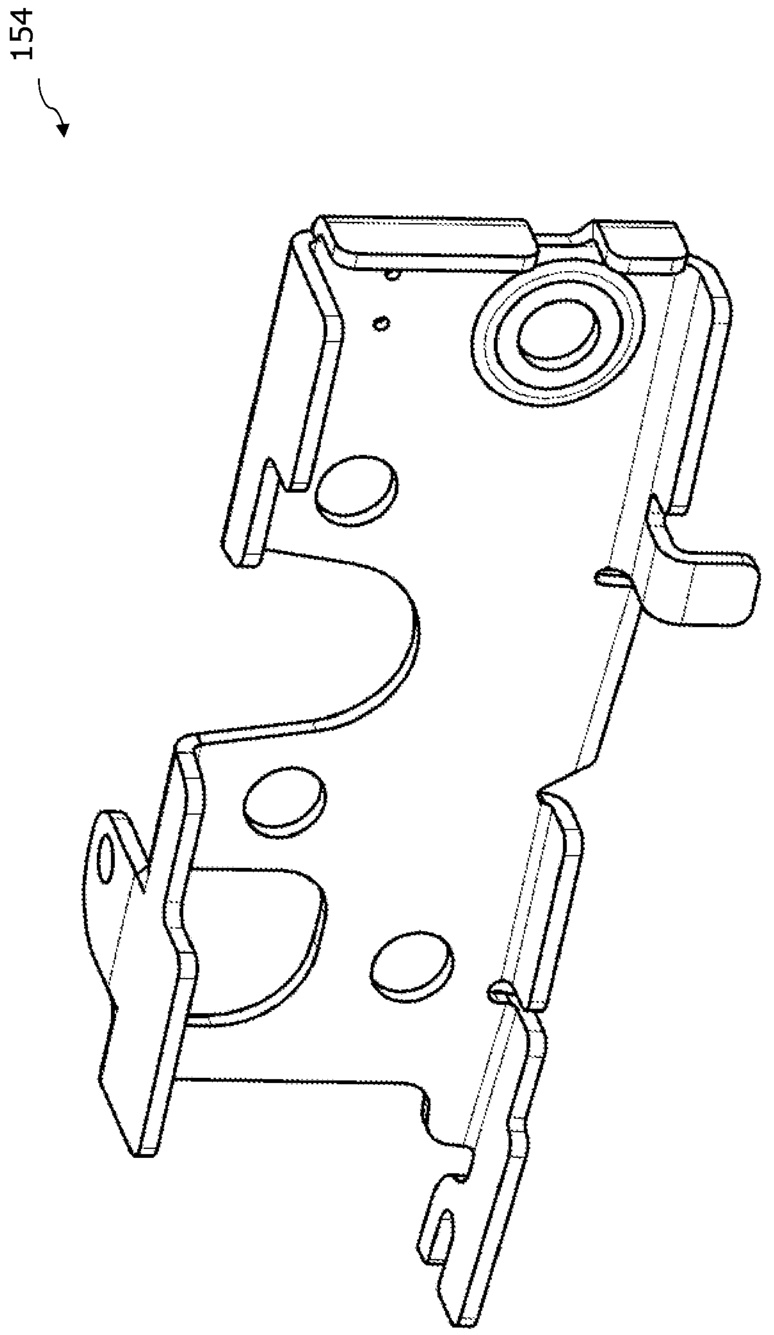
FIG. 6A is perspective view of an embodiment of a front frame of the latch system.
Figure 6B:
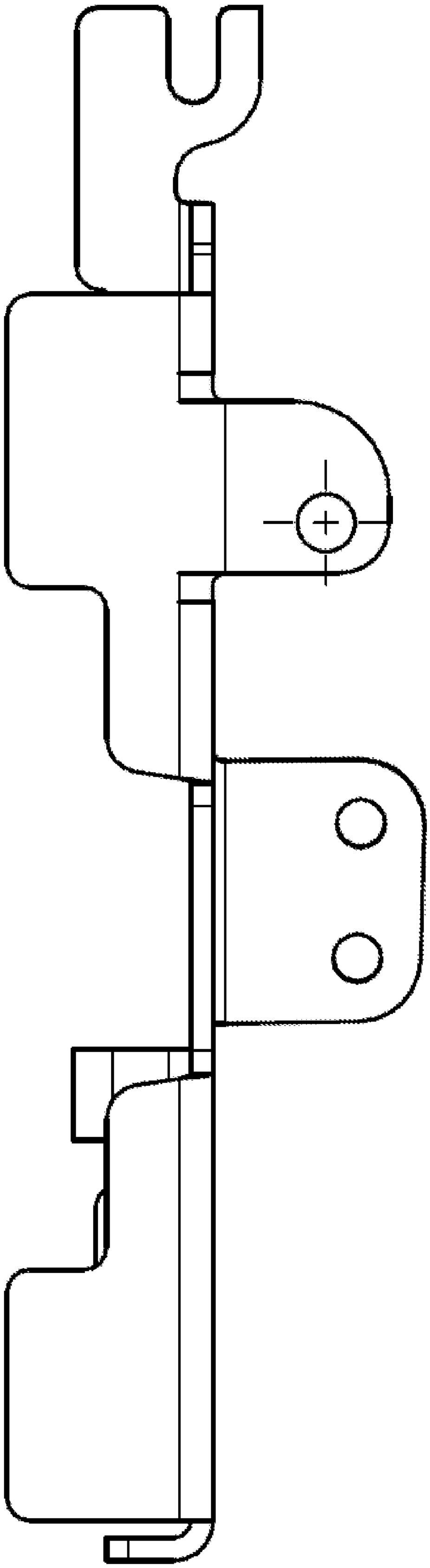
FIG. 6B is a top view of the front frame of FIG. 6A.
Figure 6C:
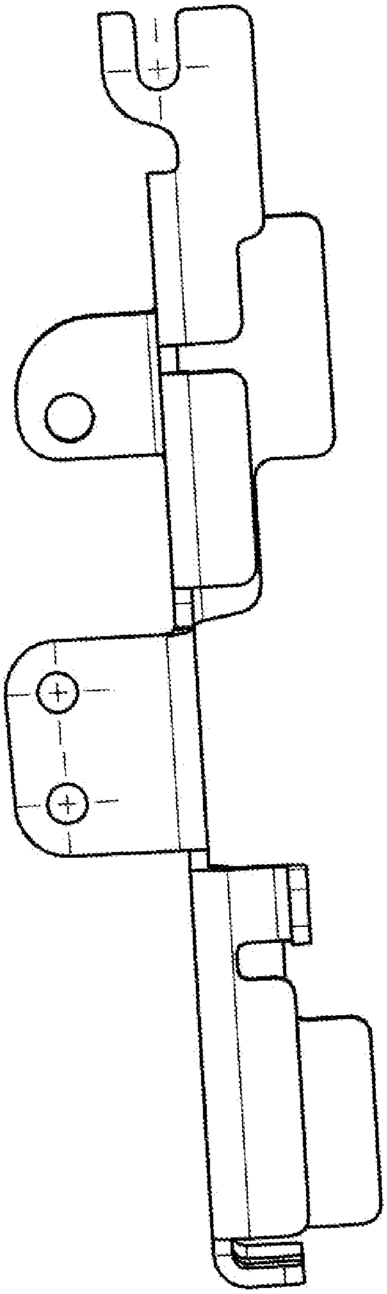
FIG. 6C is a bottom view of the front frame of FIG. 6A.
Figure 6D:
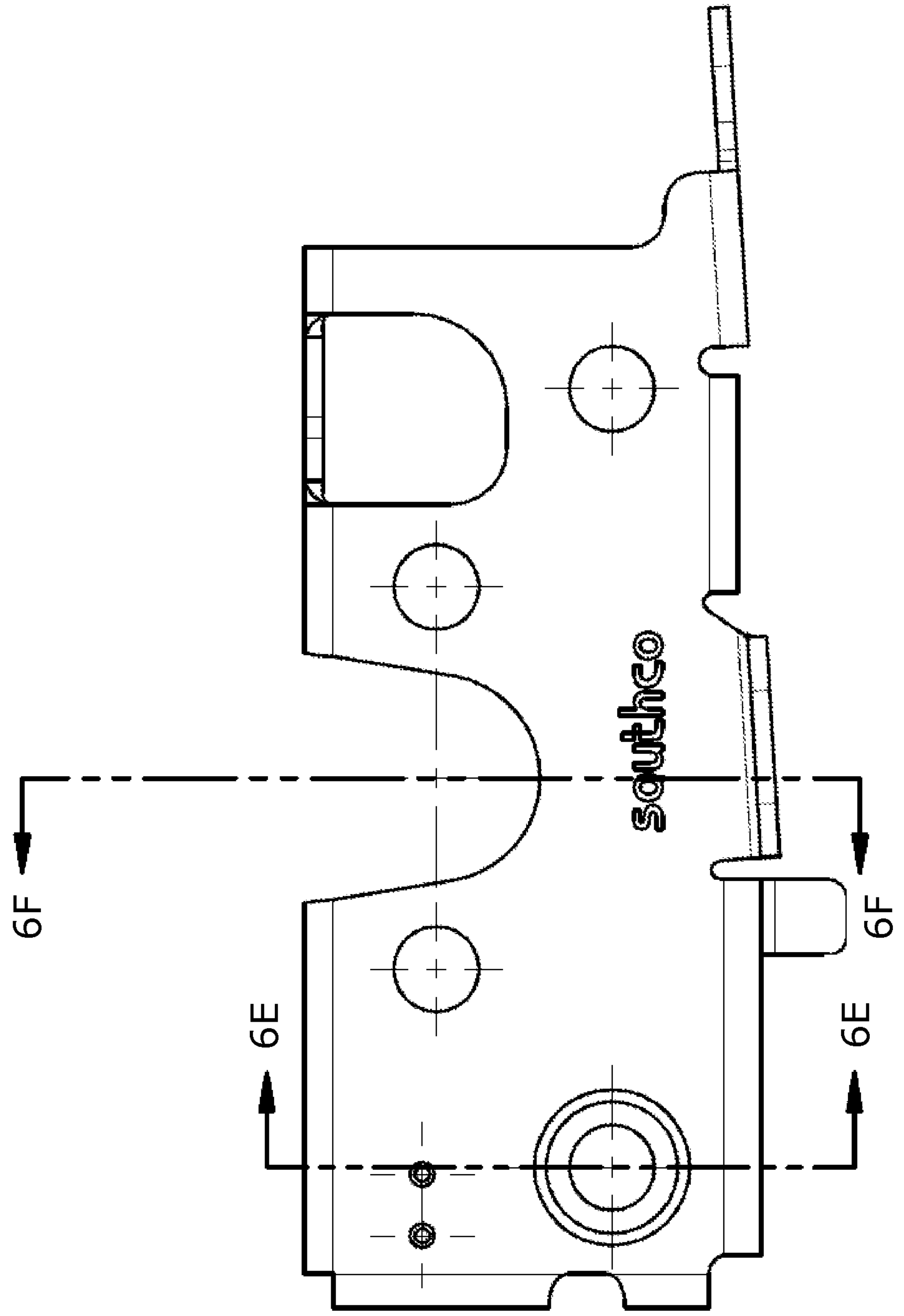
FIG. 6D is a rear view of the front frame of FIG. 6A.
Figure 6F:
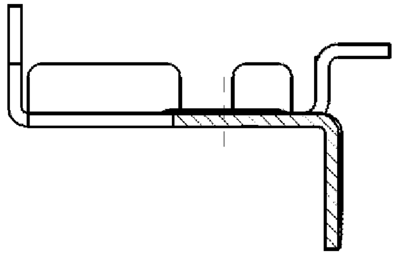
FIG. 6F is a cross-section view of a portion of the front frame of FIG. 6A, taken through line 6F-6F in FIG. 6D.
Figure 6E:
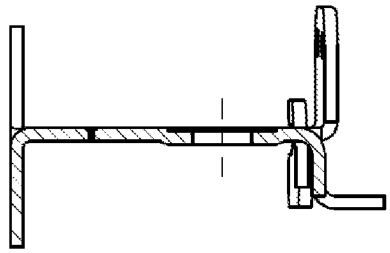
FIG. 6E is a cross-section view of a portion of the front frame of FIG. 6A, taken through line 6E-6E in FIG. 6D.

The housing 150 comprises a back frame 160 and a front frame 154. FIGS. 5A-5E disclose the details of back frame 160. As seen in FIG. 5A, the back frame 160 includes a U-shaped recess or opening 166 configured to expose a portion of the latch cams 112 when the latch cams 112 are mounted adjacent to the back frame 160. Further, the back frame 160 includes a latch cam opening 162 configured to affix or attach the latch cam 112, as illustrated in FIGS. 5B and 5D. In addition, FIGS. 5B, 5C, and 5E depict another portion of the back frame 160 that provides corresponding openings 164 for the attachment of other components of the latch system 100, such as a trigger 120, which is discussed in more detail below.

Figure 2A:
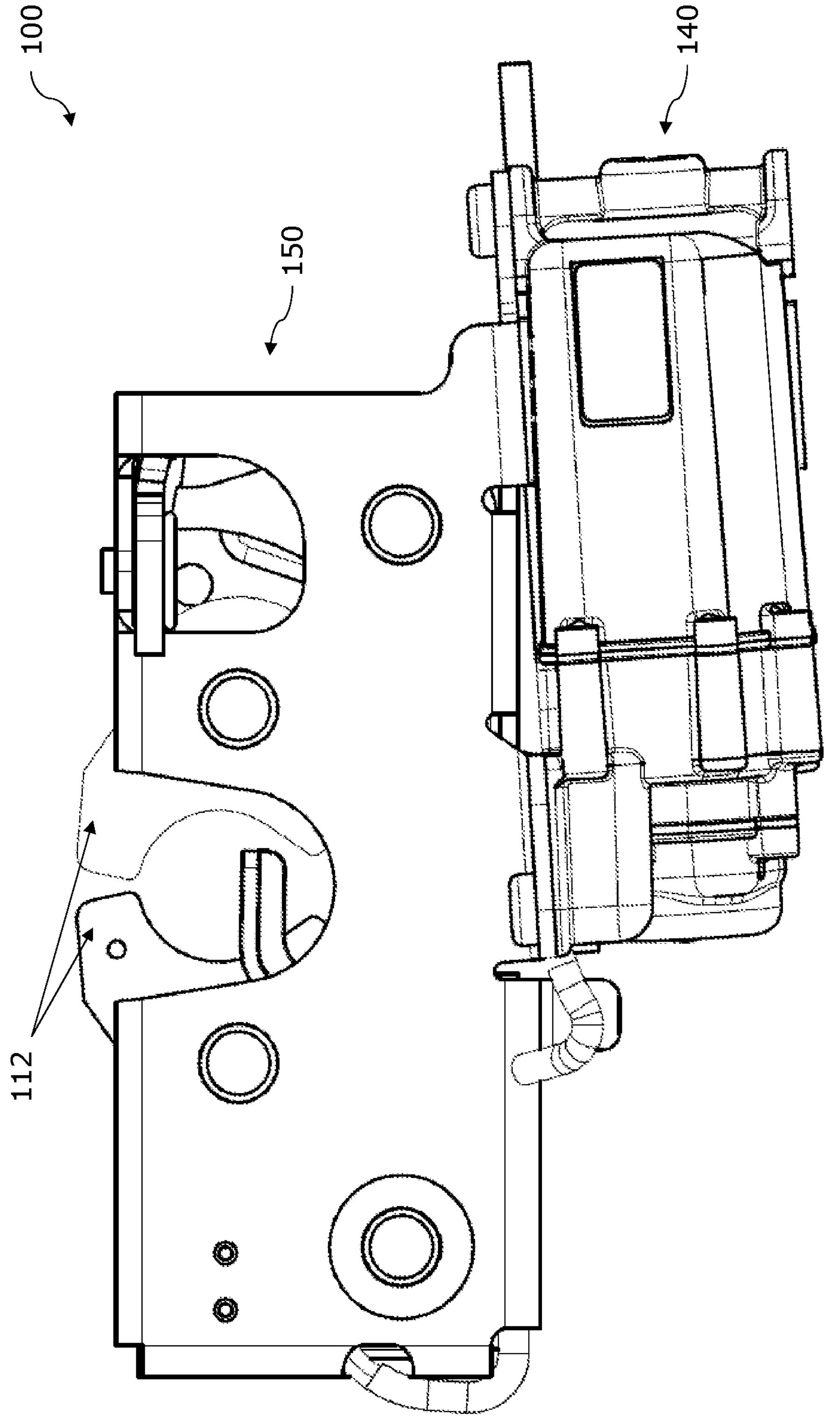
FIG. 2A is a side view of the latch system of FIG. 1A, shown without the striker.
Figure 2B:
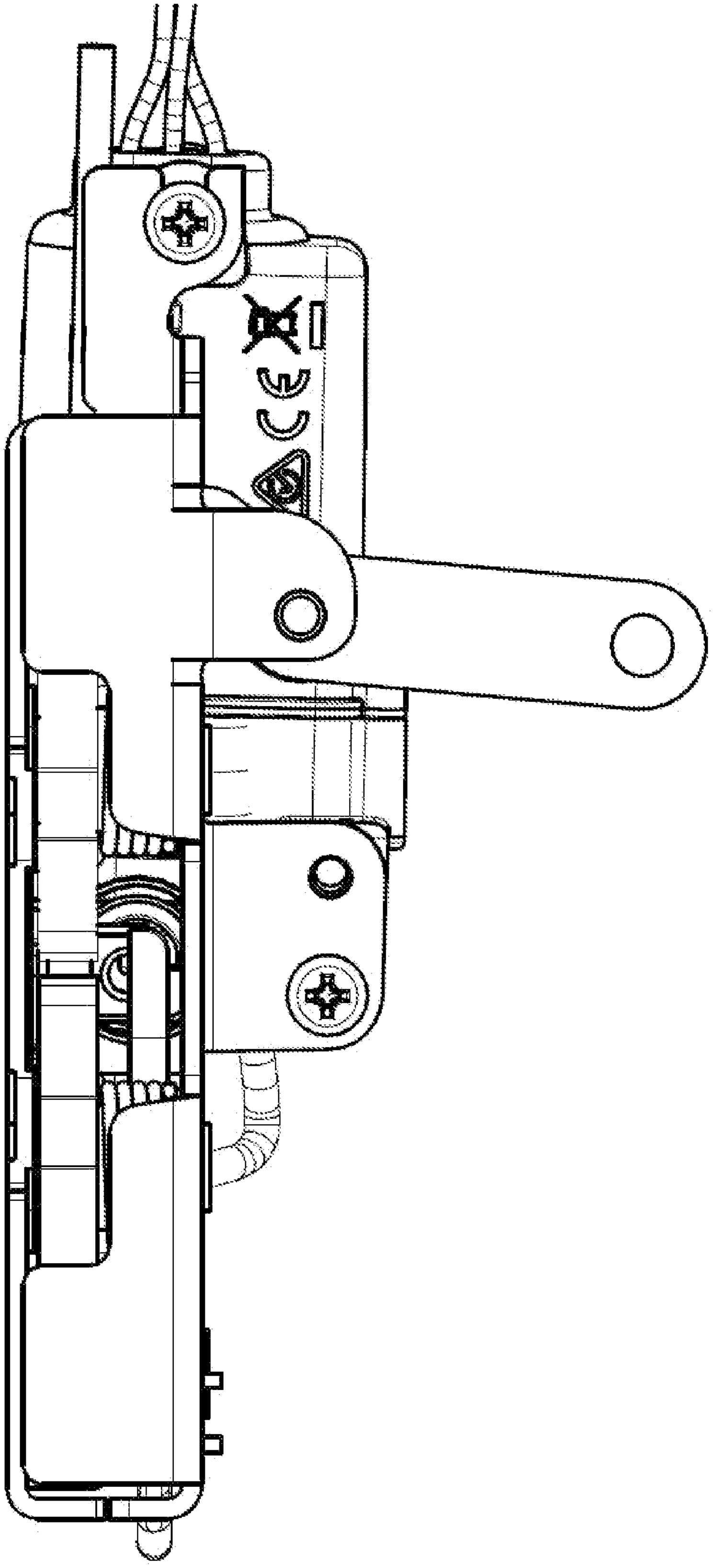
FIG. 2B is a top view of the latch system of FIG. 2A.

As shown in FIGS. 6A-6F, the front frame 154 is sized and shaped in accordance with the back frame 160, such that some of the components of the latch system 100 are at least partially enclosed within, when the front frame 154 and the back frame 160 are fixed or attached together. For example, as seen in FIGS. 1A and 2A, the wiring or physical connections among one or more components of the latch system 100 may be partially outside the housing 150. The actuator 140 is affixed to the front frame 154 via fastening means, such as a rivet 153 and screw 152 (not shown). Other suitable attachment mechanisms will be known to one of ordinary skill in the art from the description herein.

Figure 3A:
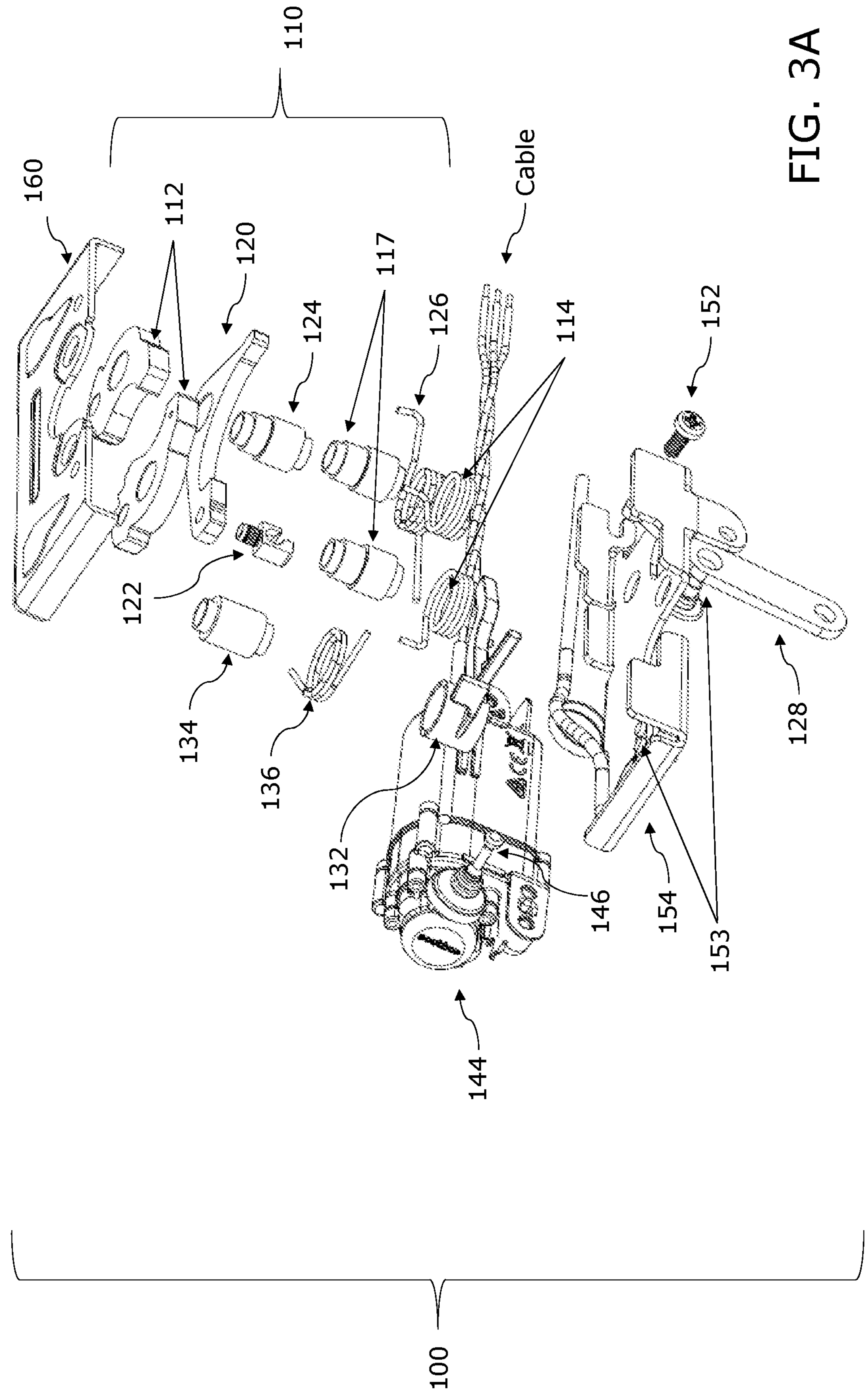
FIG. 3A is an exploded view of the latch system.
Figure 3B:
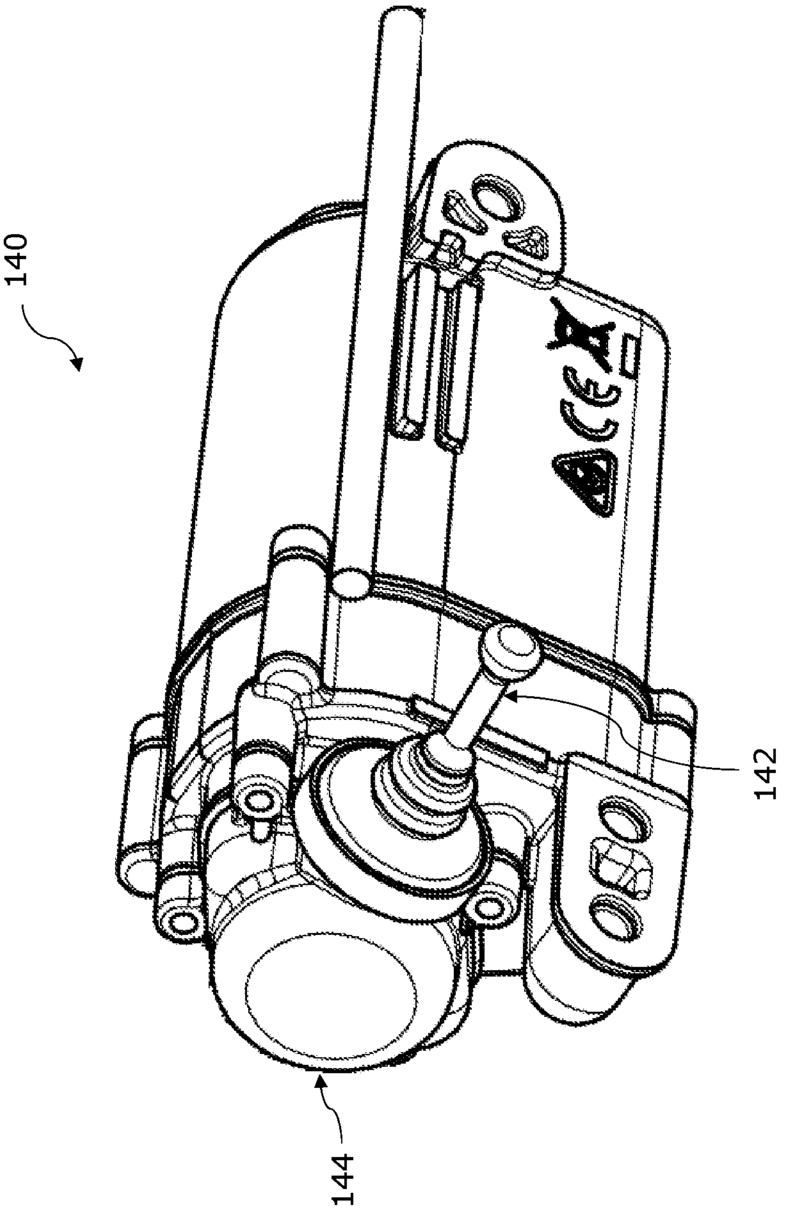
FIG. 3B is a perspective view of an embodiment of an actuator of the latch system.

Referring now to FIG. 3A, the latch system 100 further includes components, such as the pair of latch cams 112, the trigger 120, the motor 144, and the connector 146. The latch cams 112 are mounted to the back frame 160 via pins 117 and are configured to rotate between a closed position and an open position. Preferably, as seen in FIG. 3A, the latch cams 112 are mounted to rotate between a closed position and an open position by biasing means, such as springs 114 (FIG. 3A).

Figure 12A:
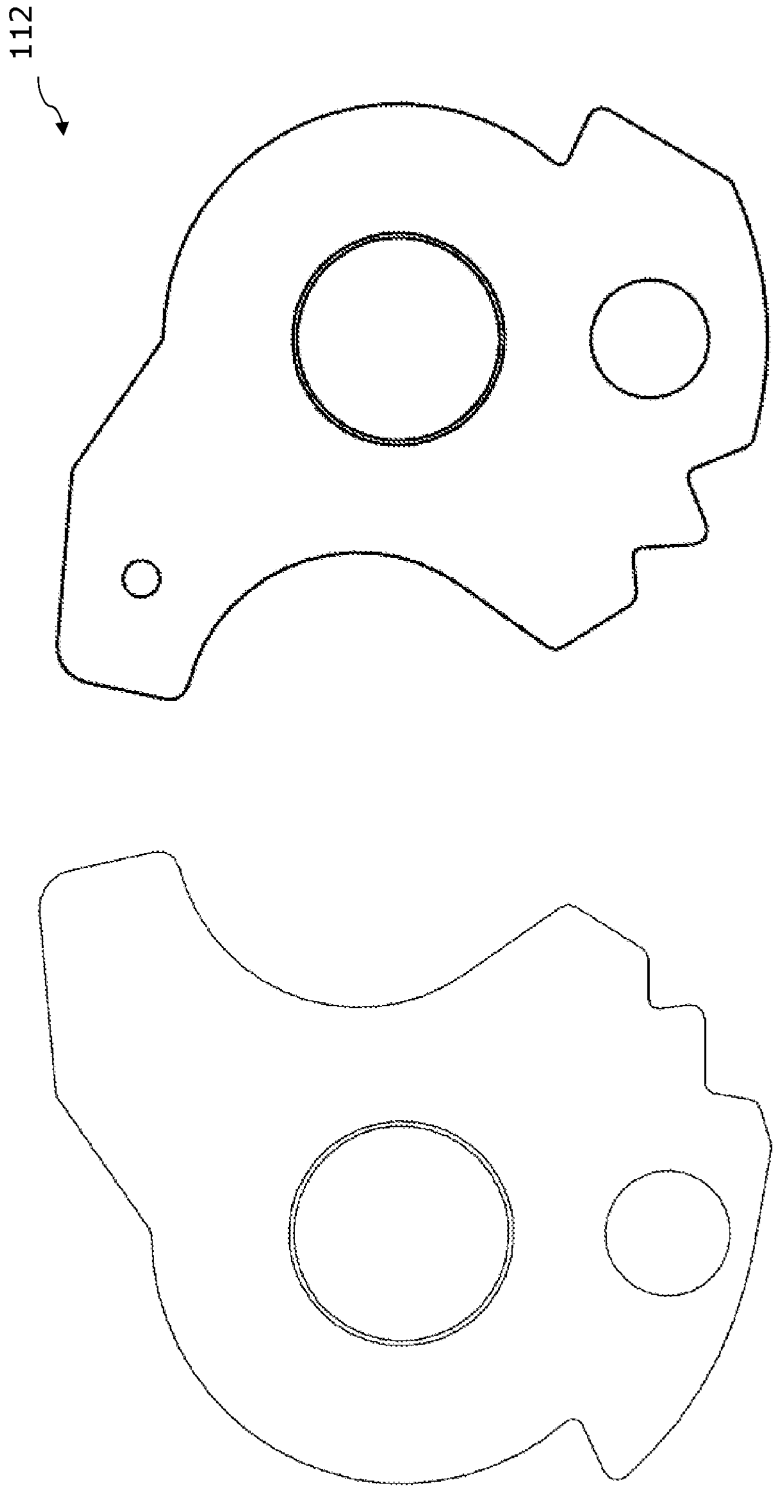
FIG. 12A is a side elevational view of an embodiment of a pair of latch cams that can be incorporated in a latch system.

As seen in FIG. 12A, the latch system 100 may have a single latch cam 112 or a pair of plural latch cams 112, each mounted to rotate between the closed position and open position. Together, the plural latch cams 112 are configured to engage or capture the striker 190 when the plural latch cams 112 are in their closed positions, as illustrated in FIG. 4C. In particular, the latch cams 112 in their closed positions together define a central region 113 (FIG. 4B), such as a striker-receiving recess, into which the striker 190 can extend once it is captured. Specifically, the striker 190 makes contact with a generally curved and smooth portion 111 of the latch cam 112 when the striker 190 is captured within the striker-receiving recess 113. In addition, the plural latch cams 112 have an end portion that is toothed and is configured to contact the trigger 120 when the plural latch cams 112 rotate between the open position to the closed position.

Figure 12B:
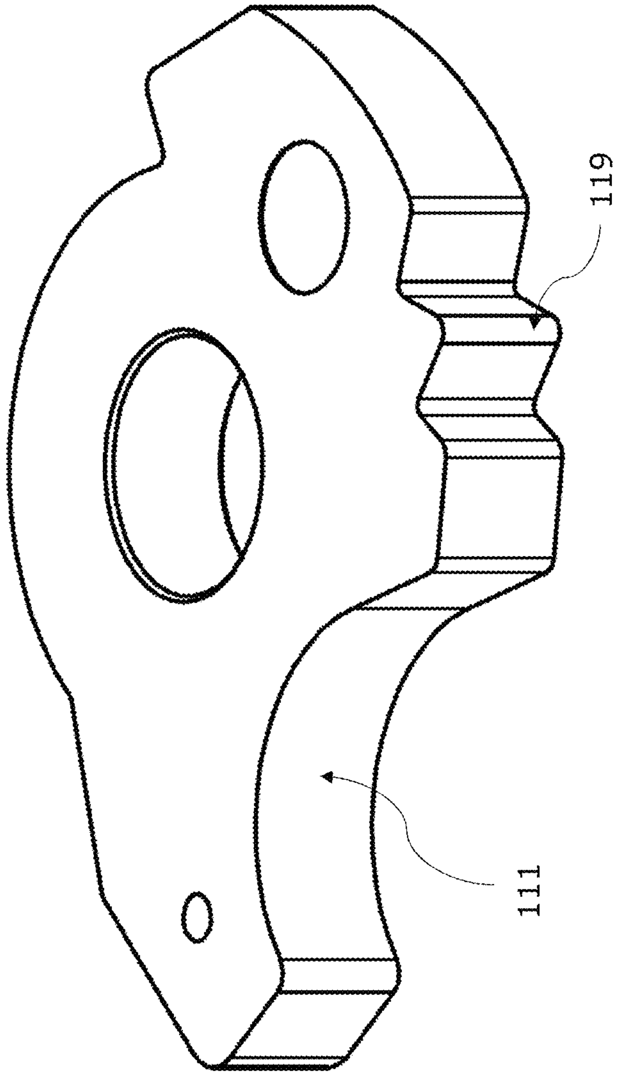
FIG. 12B is a perspective view of one of the latch cams of FIG. 12A.
Figure 12C:
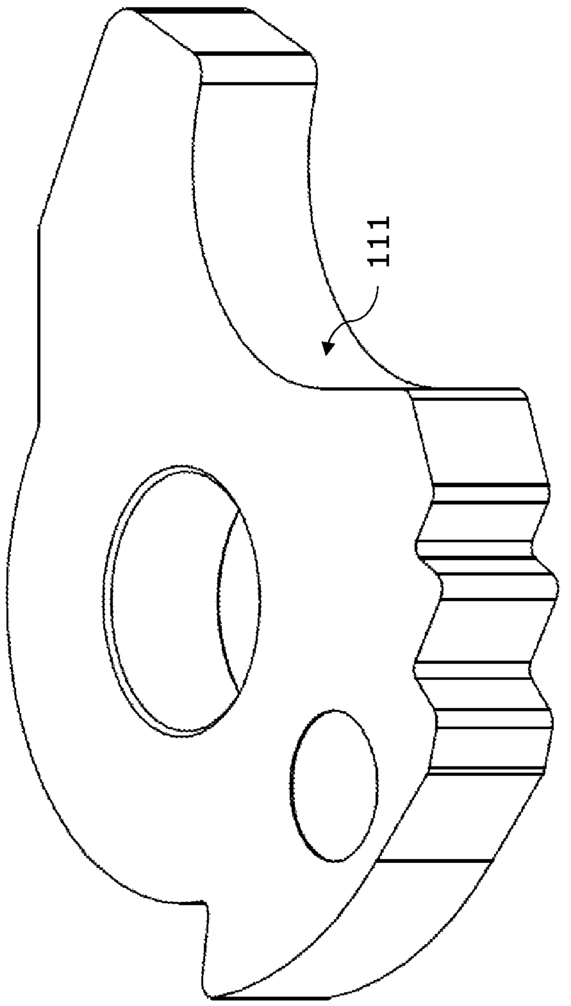
FIG. 12C is a perspective view of another one of the latch cams of FIG. 12A.
Figure 13A:
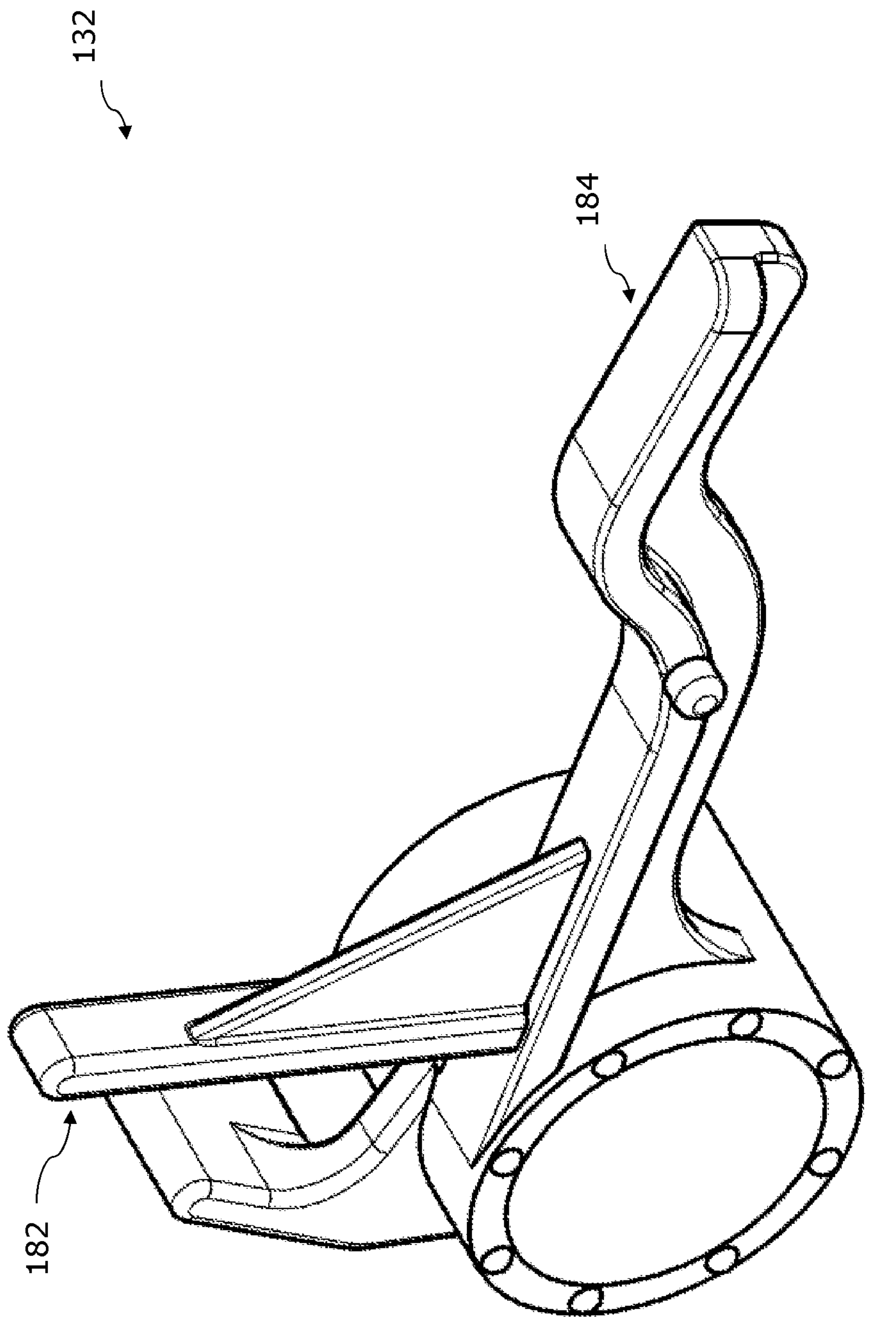
FIG. 13A is a perspective view of an embodiment of a sensing arm that can be incorporated in a sensor assembly according to an embodiment of the invention.
Figure 13B:
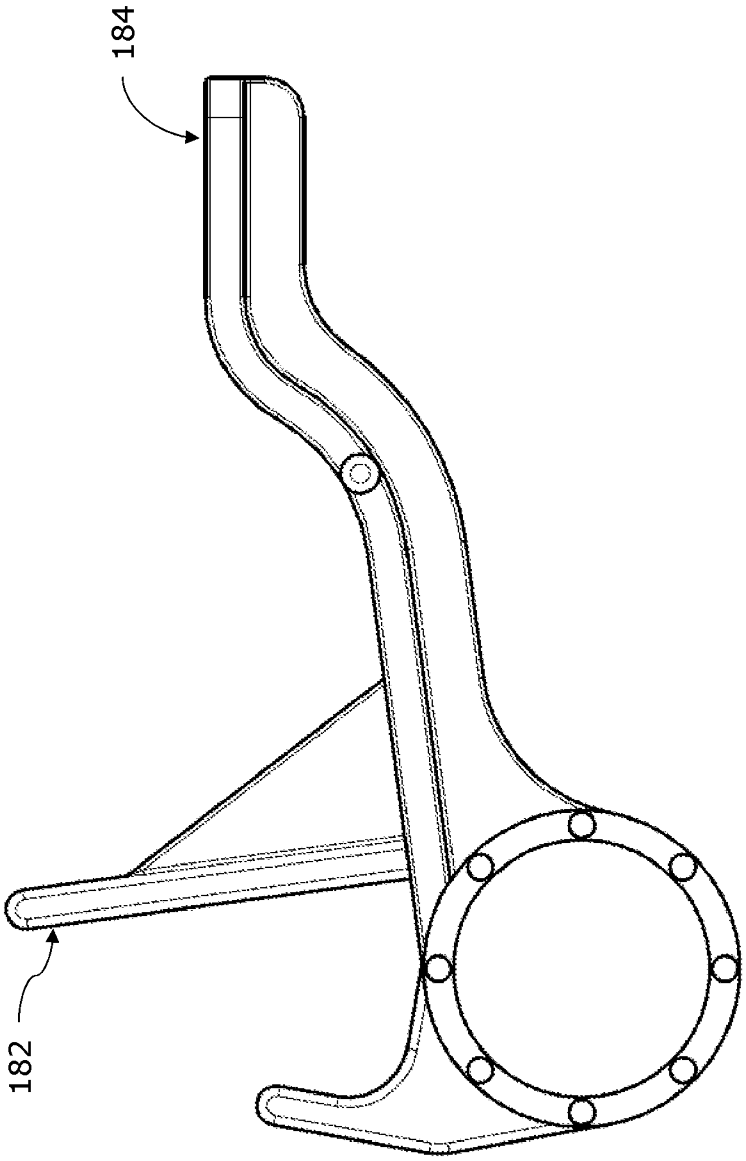
FIG. 13B is a side view of the sensing arm of FIG. 13A.
Figure 13C:
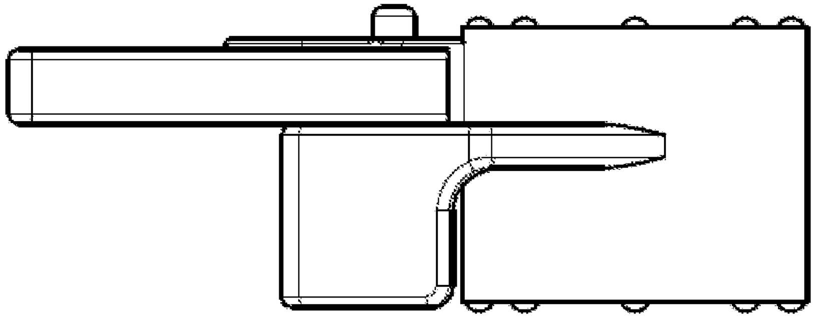
FIG. 13C is a rear view of the sensing arm of FIG. 13A.
Figure 13D:
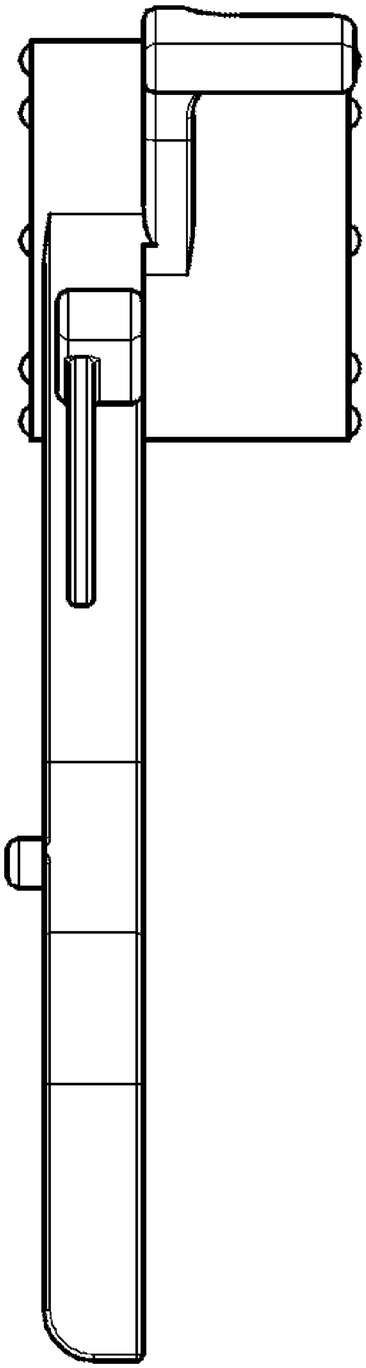
FIG. 13D is a top view of the sensing arm of FIG. 13A.

Finally, FIGS. 12B and 12C each depict a first and second embodiment of the latch cam 112 in accordance with an embodiment of the invention. In particular, FIG. 12B depicts the first embodiment of the latch cam 112, such as an outside cam adapted to be disposed adjacent to a sensor assembly 200 (discussed further below). Additionally, FIG. 12C depicts the second embodiment of the latch cam 112, such as an inside cam adapted to be disposed adjacent to a trigger pin 124 (discussed further below). Thus, the plural latch cams 112 of this embodiment are asymmetric in shape and therefore are not intended to be interchangeable.

Figure 8B:
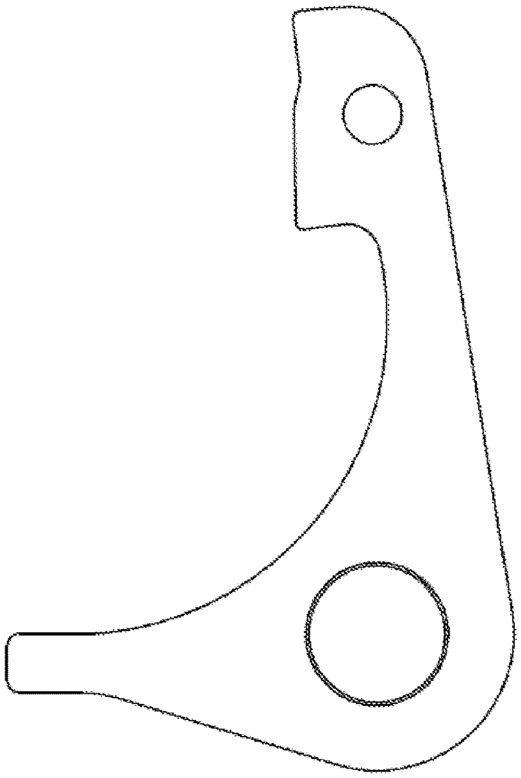
FIG. 8B is a side view of the trigger of FIG. 8A.
Figure 8A:
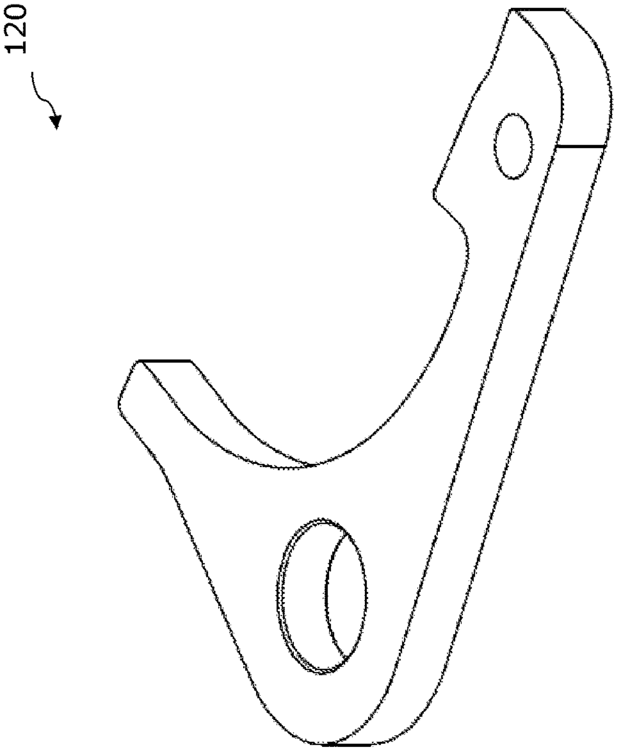
FIG. 8A is a perspective view of an embodiment of a trigger that can be incorporated in a latch system according to the invention.
Figure 9A:
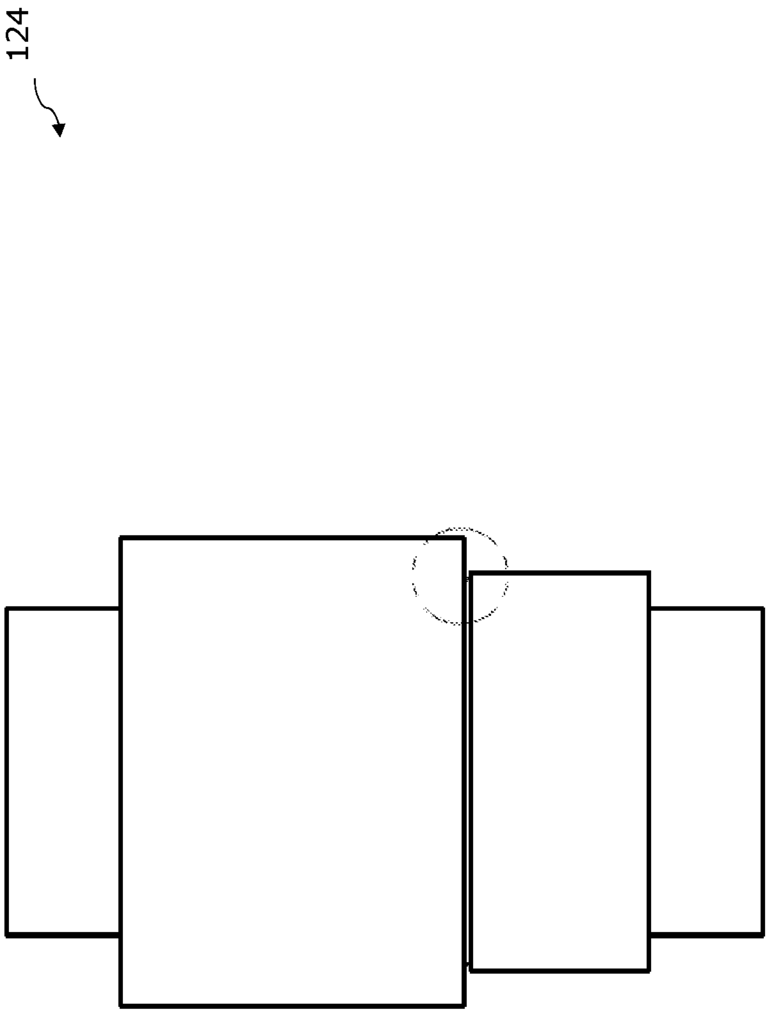
FIG. 9A is a front view of an embodiment of a trigger pin that can be incorporated in a latch system according to the invention.
Figure 9C:
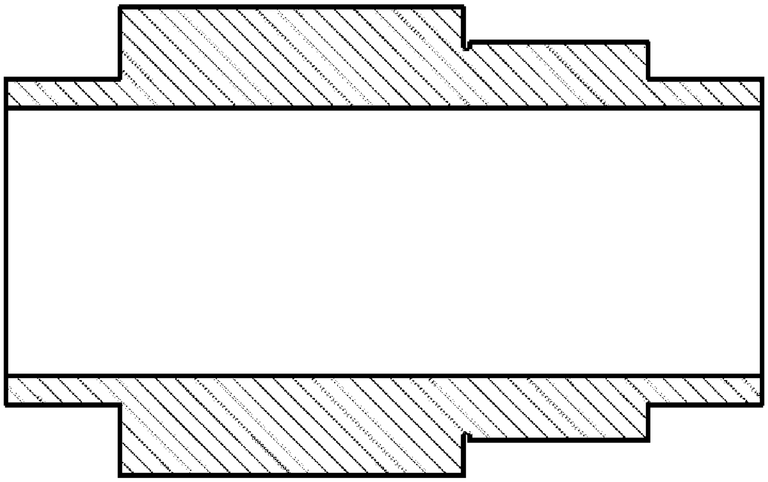
FIG. 9C is a cross-section view of the trigger pin of FIG. 9A, taken through line 9C-9C in FIG. 9B.
Figure 9B:
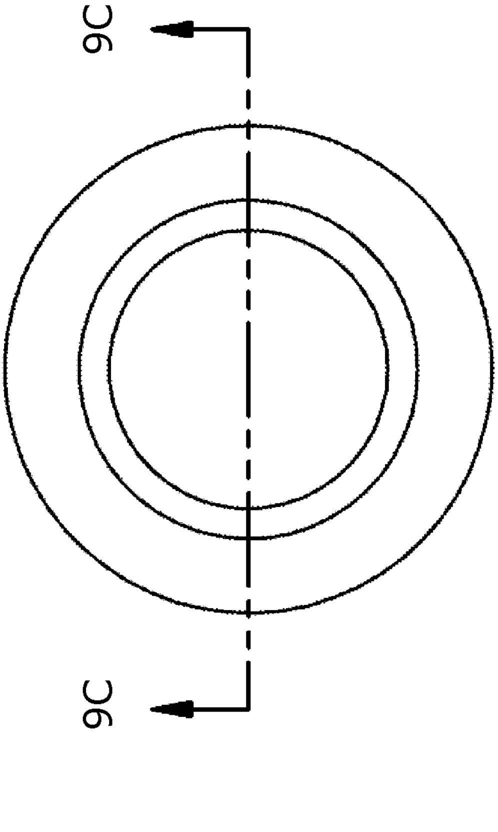
FIG. 9B is a top view of the trigger pin of FIG. 9A.
Figure 10B:
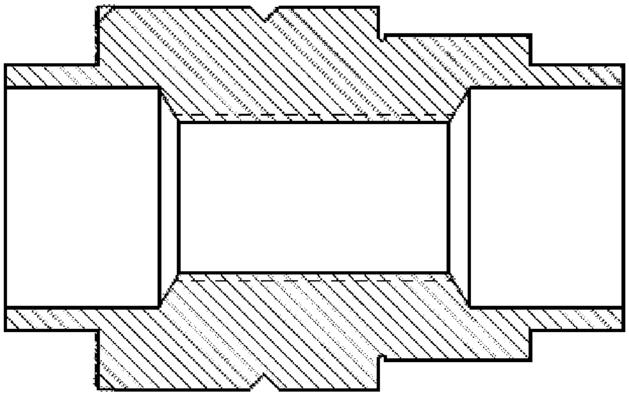
FIG. 10B is a cross-section view of the trigger pin of FIG. 10A, taken through line 10B-10B in FIG. 10A.
Figure 10A:
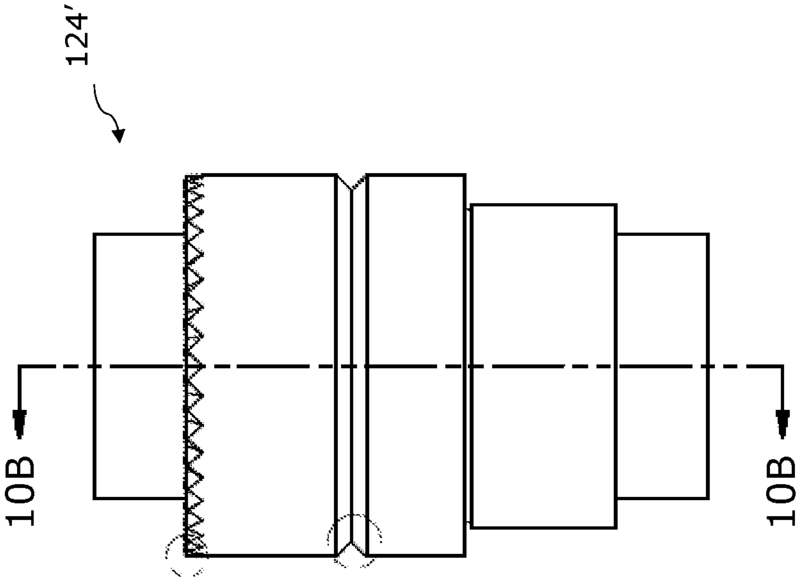
FIG. 10A is a top view of another embodiment of a trigger pin that can be incorporated in a latch system according to the invention.

The latch system 100 also includes the trigger 120, which is mounted to the latch 110 and is configured to rotate between a locked position and an unlocked position. Preferably, the trigger 120 may be biased by spring 126 (FIG. 3A), for example, to rotate between the locked position and the unlocked position. As seen in FIGS. 8A-8B, the trigger 120 is shaped and sized to be at least partially enclosed within the housing 150. Further, the trigger 120 is positioned to contact at least a portion of the latch cams 112, e.g. a trigger contact surface 119 (FIG. 12B), when the trigger 120 is in the locked position, thereby retaining the latch cams 112 in the closed position, as illustrated in FIG. 4C. The contact between the trigger 120 and the latch cams 112 is facilitated, in part, by a trigger pin 124. FIGS. 9A-9C disclose details of a first embodiment of trigger pin 124. FIGS. 10A-10B disclose details of yet another embodiment of trigger pin 124'.

In addition, the trigger 120 of the latch 110 includes an extension 128, such as a manual release lever (FIG. 3A), for access from outside of the housing 150. The extension 128 is configured such that a force applied to the extension 128 urges the trigger 120 toward the unlocked position or allows it to move toward the unlocked position. Preferably, this application of force to the extension 128 is facilitated via engaging the extension 128, which extends outside of the housing 150 (FIG. 3A).

Figure 4A:
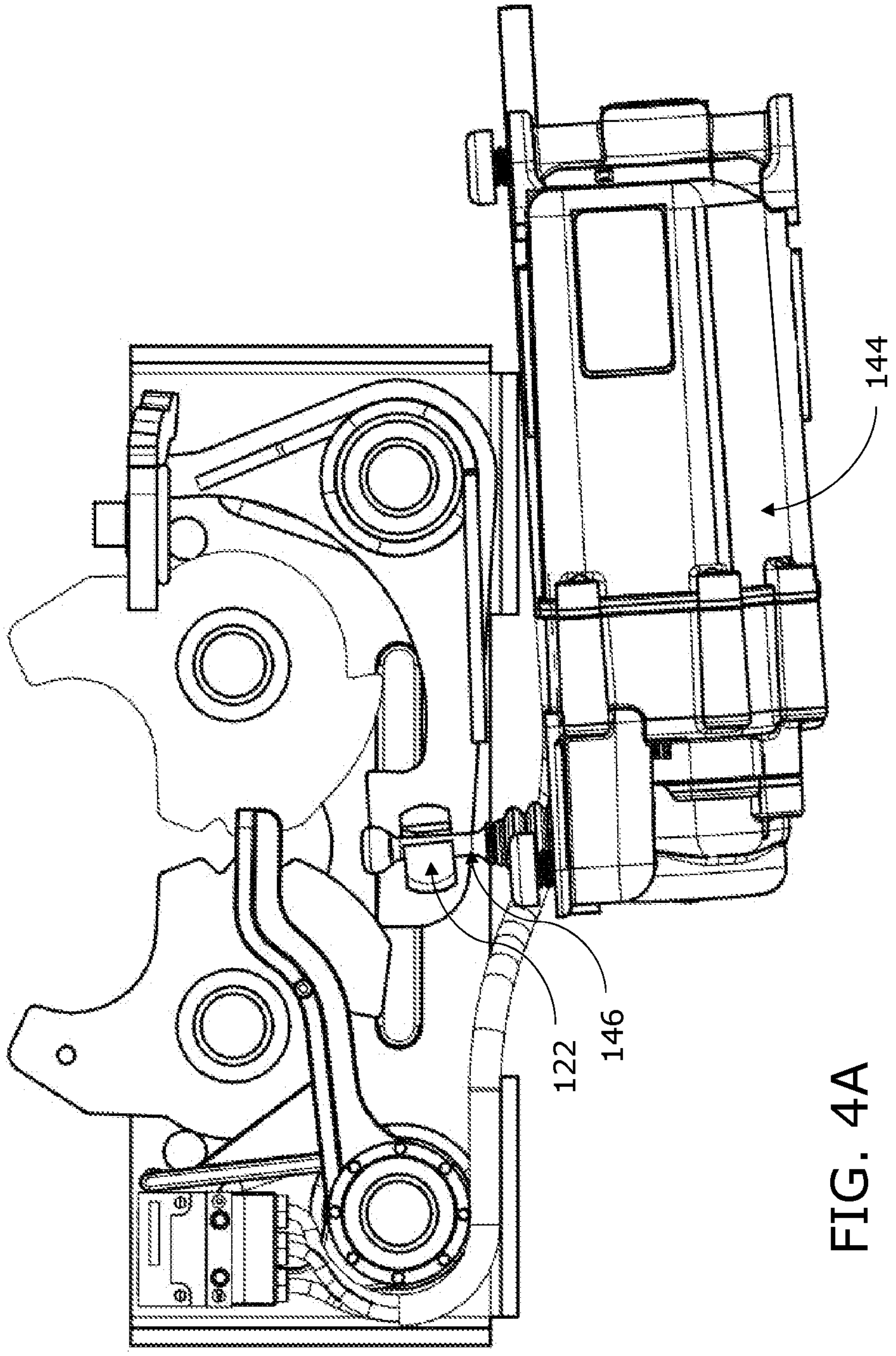
FIG. 4A is side view of the latch system of FIG. 2A, with a front frame removed, showing a sensing arm in an unlatched position according to an embodiment of the invention.
Figure 4B:
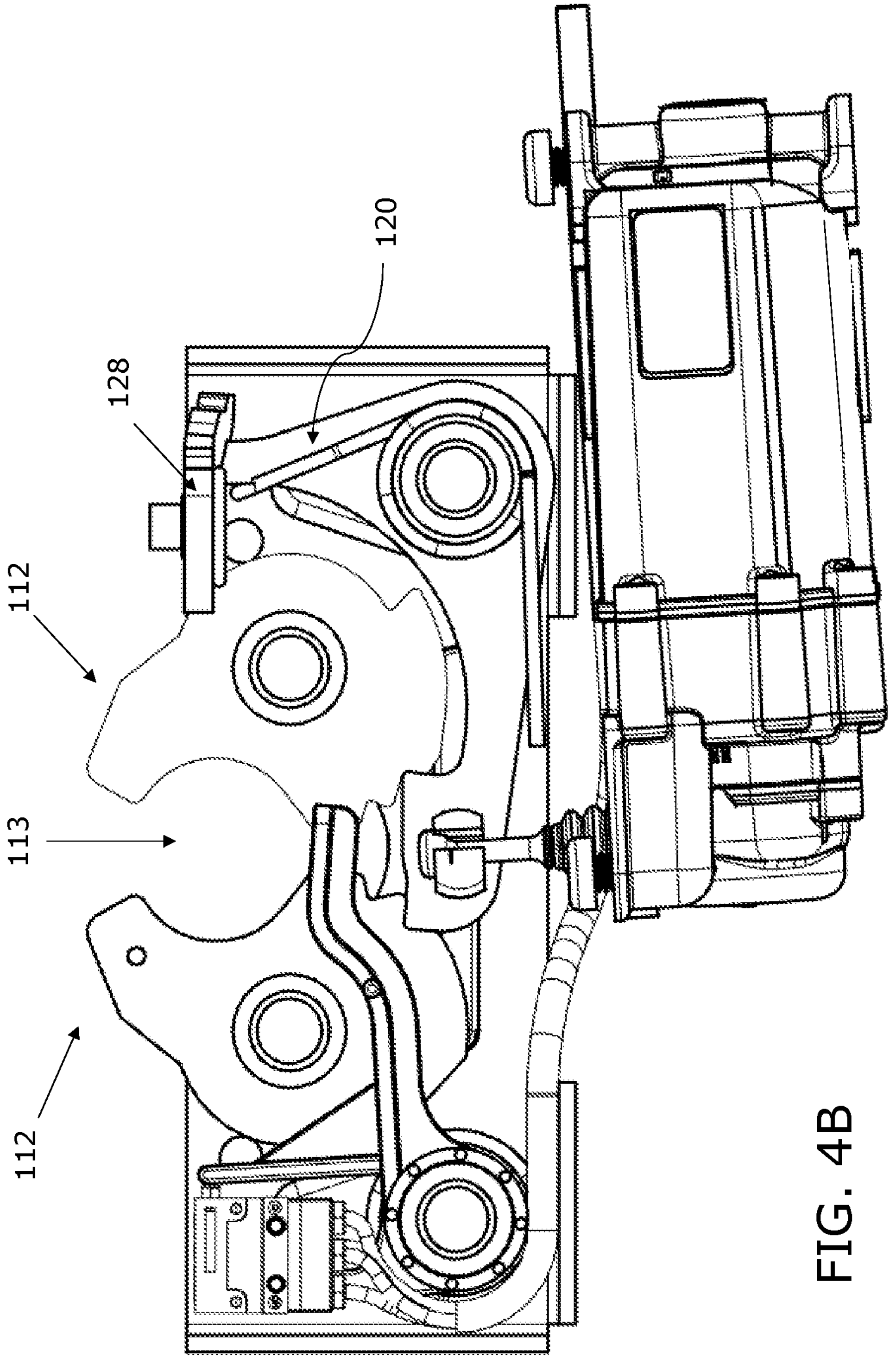
FIG. 4B is a side view of the latch system of FIG. 4A, showing the sensing arm in a secondary stage or a partially latched position according to an embodiment of the invention.
Figure 4C:
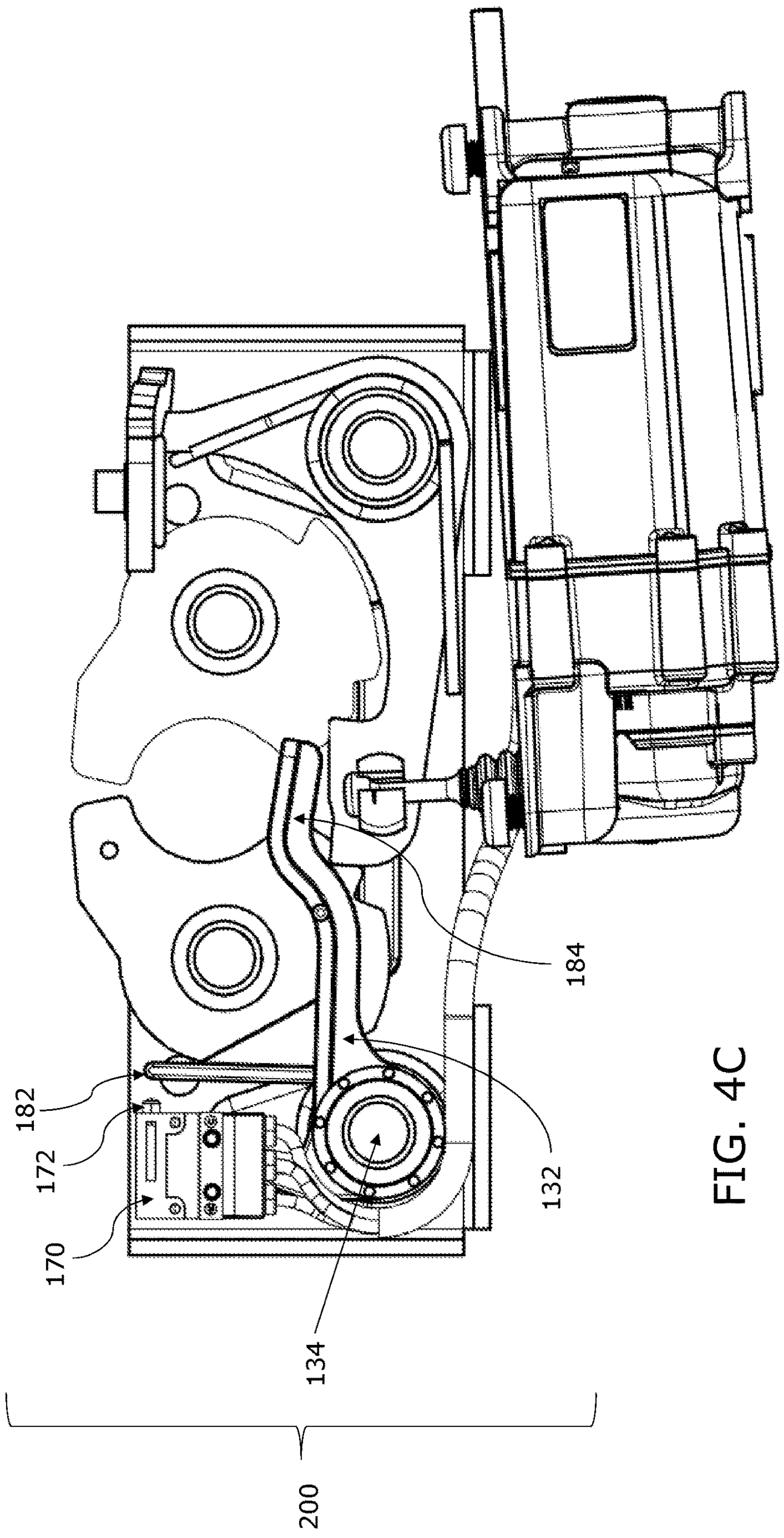
FIG. 4C is a side view of the latch system of FIG. 4A, showing the sensing arm in a latched position according to an embodiment of the invention.
Figure 7A:
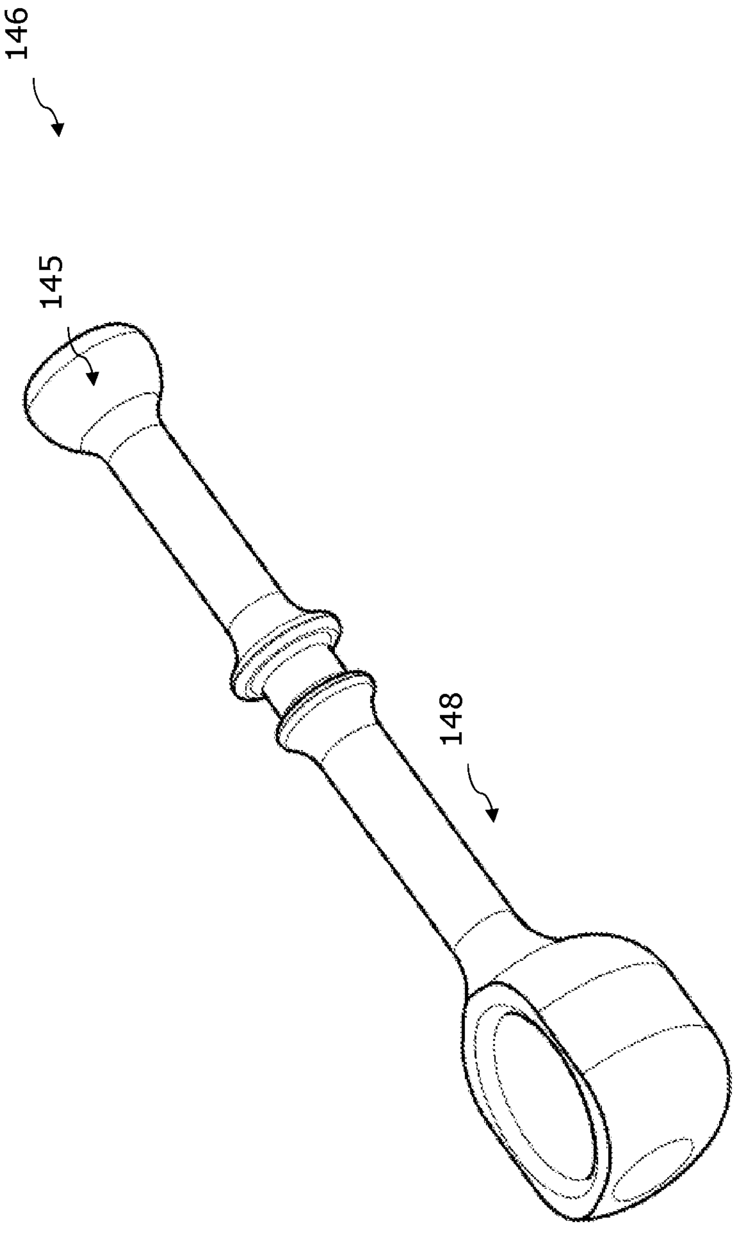
FIG. 7A is a perspective view of an embodiment of a connector that can be incorporated in a latch system according to the invention.
Figure 11A:
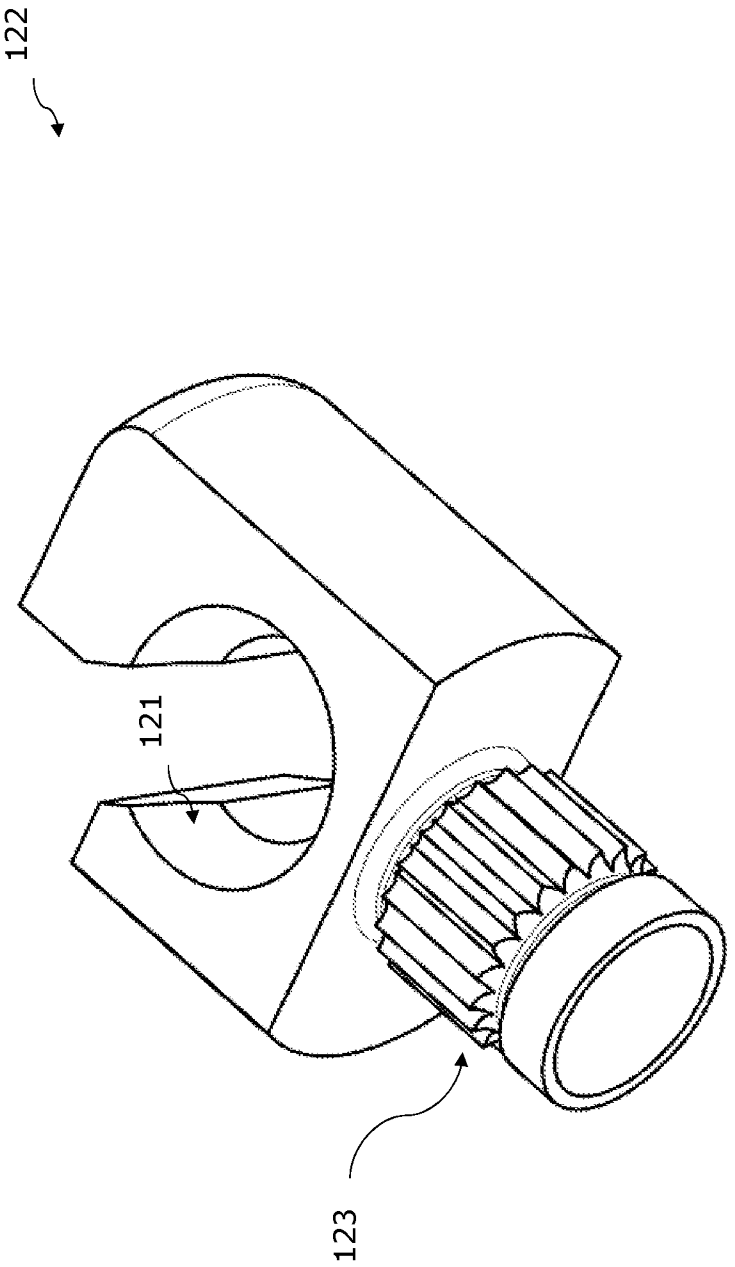
FIG. 11A is a perspective view of an embodiment of a trigger insert that can be incorporated in a latch system according to the invention.
Figure 11C:
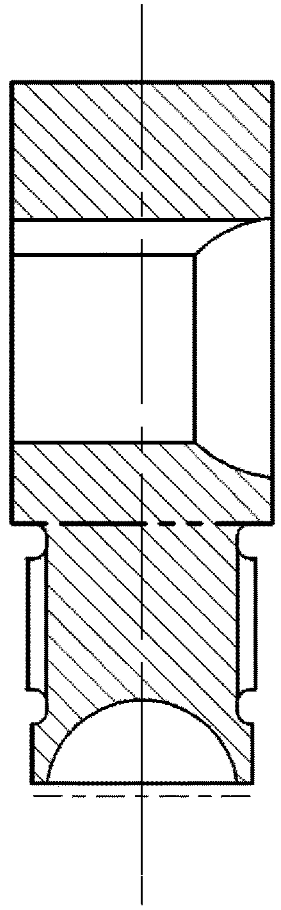
FIG. 11C is a cross-section of the trigger insert of FIG. 11A, taken through line 11C-11C in FIG. 11B.
Figure 11B:
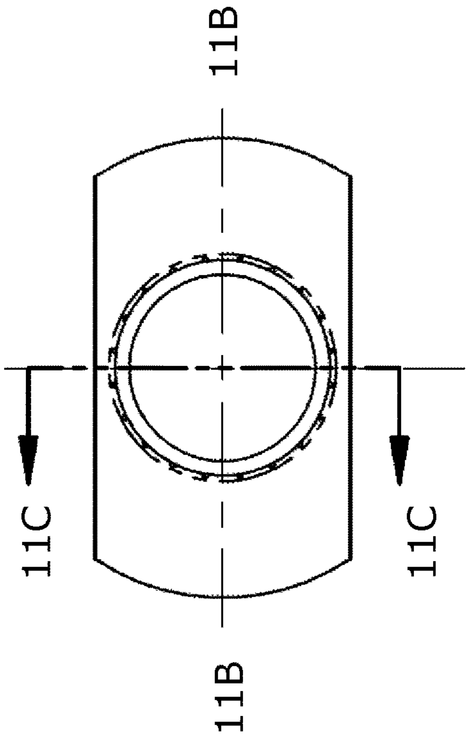
FIG. 11B is an end view of the trigger insert of FIG. 11A.
Figure 11E:
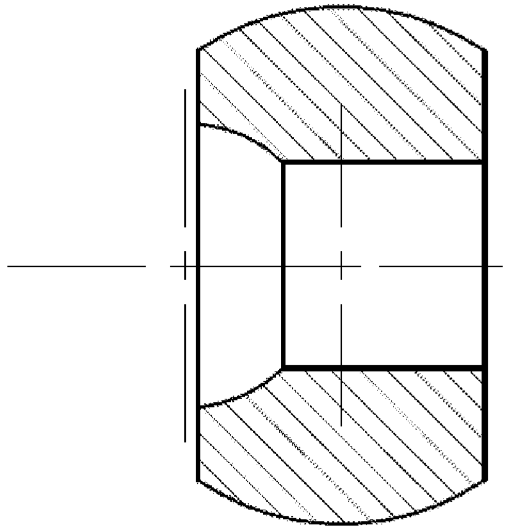
FIG. 11E is a cross-section of the trigger insert of FIG. 11A, taken through line 11E-11E in FIG. 11D.
Figure 11D:
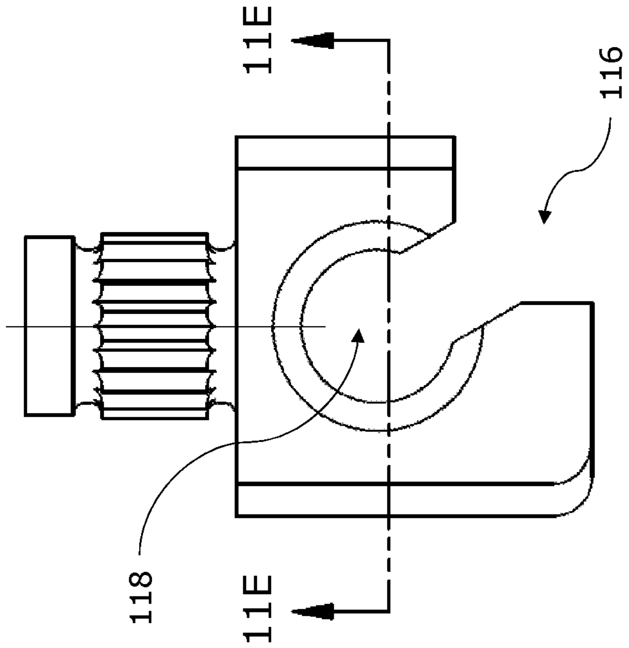
FIG. 11D is a top view of the trigger insert of FIG. 11A.

Finally, as seen in FIGS. 4A to 4C, the trigger 120 includes a trigger surface 121, such as defined by a trigger insert 122. FIGS. 11A-11E disclose details of the trigger insert 122. The trigger insert 122 may be fixed to the trigger 120 by a threaded or knurled or press-fittable end portion 123, as seen in FIG. 11A. It should be understood, however, that trigger insert 122 and trigger 120 may be integrally formed as a single body of unitary construction. The concave shape of at least a portion of the trigger insert 122 corresponds to the convex shape 145 of at least a portion of the connector 146 (FIG. 7A). In particular, referring now to FIG. 11D, the trigger insert 122 defines an axial aperture 118 extending along a connector axis (along line 7C-7C in FIG. 7B) of the connector 146 and therefore receiving the connector 146. The trigger insert 122 also defines a transverse aperture 116, extending transverse to the connector axis, through which the connector 146 is inserted. Details of the connector 146 are discussed below.

The latch system 100 further comprises the actuator 140 having the connector 146, such as a pull rod, which is positionable to engage the trigger 120, as illustrated in FIGS. 4A-4C. The connector 146 engages the trigger 120 because the connector 146 is movable linearly along the connector axis (along line 7C-7C) between a locking position (FIG.

4C) and an unlocking position (FIG. 4A). Specifically, the connector 146 is extended in the locking position (upwardly in FIG. 4C) and retracted when in the unlocking position (FIG. 4A).

Figure 7C:
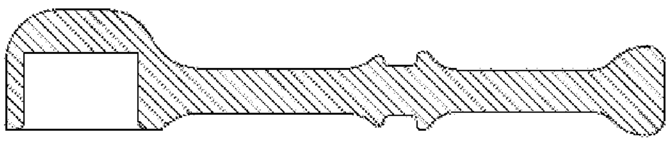
FIG. 7C is a cross-section view of the connector of FIG. 7A, taken through line 7C-7C in FIG. 7B.
Figure 7B:
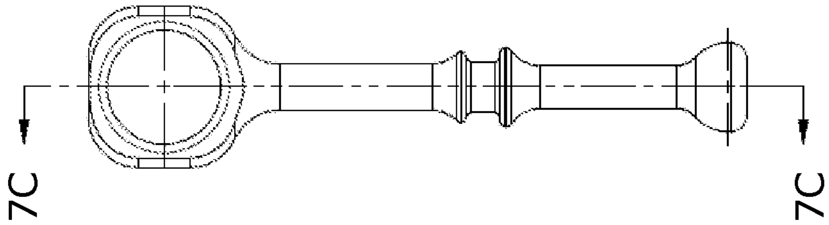
FIG. 7B is a front elevational view of the connector of FIG. 7A.

Referring now to FIGS. 7A-7C, the connector 146 has a connector surface 145 that is configured to be engaged by the trigger 120. More specifically, the connector surface 145 comprises a spherical portion configured to be engaged by the trigger insert 122. The shape of the spherical portion of the connector surface 145 is generally complementary in shape and size to the trigger insert 122. This ball-and-socket type of joint between the trigger insert 122 and the connector 146 allows the actuator 140 to translate a linear movement while rotating the trigger 120.

Furthermore, the connector 146 is aligned by the trigger insert 122 upon its engagement by the trigger insert 122, as illustrated in FIGS. 4A-4C. Advantageously, the ball-and-socket type of joint allows the connector 146 to self-align when the actuator 140 reengages from the trigger 120, such as when the trigger 120 is manually moved from the locked position toward the unlocked position. Once aligned, the trigger insert 122 and the connector surface 145 can be separable when the trigger 120 is moved from the locked position toward the unlocked position, while the connector 146 remains locked or positioned within the axial aperture 118 of the trigger insert 122. In other words, the connector surface 145 is moveable or separable from the trigger insert 122 when the trigger moves from the locking position to the unlocking position.

Additionally, the connector 146 is generally aligned with the central region 113 defined by the latch cams 112, as illustrated in FIG. 4B. For example, the connector 146 has an axis that passes between striker receiving surfaces of the latch cams 112. This alignment maintains a mechanical advantage because this permits the placement of the actuator 140 directly below where the trigger 120 and the latch cams 112 interface.

Specifically, movement of the connector 146 from the unlocking position toward the locking position by the motor 144 permits the trigger 120 to move from the unlocked position toward the locked position, with a reduction in actuation time and a decrease in stress applied to the actuator 140. Similarly, movement of the connector 146 from the locking position toward the unlocking position by the motor 144 moves the trigger 120 from the locked position toward the unlocked position, also with a reduction in actuation time and a decrease in stress applied to the actuator 140.

As illustrated in FIG. 4B, the location of contact between the connector 146 and the trigger 120 is at a distal portion of the trigger 120 spaced from the pivot axis of the trigger 120. Accordingly, the force needed to rotate the trigger 120 by the connector 146 is reduced and the moment is increased. This arrangement also helps to reduce actuation time and decrease the stress applied to the actuator 140.

The reduction in actuation time and decrease in stress applied to the actuator 140, which is achieved by one or more of the location of contact between the connector 146 and the trigger 120 and the location of the connector 146 vis-h-vis the cams, enables the latch system 100 to have a high life cycle despite high frequency use of the latch system 100. Another advantage of this embodiment of the invention includes permitting the actuator 140 to easily be repositioned for better packaging.

The latch system 100 further comprises the actuator 140 comprising the motor 144 coupled to the connector 146, as illustrated in FIGS. 4A-4C. The motor 144 is configured to move the connector 146 between the unlocking position and the locking position. More specifically, when the connector 146 of the actuator 140 is moved by the motor 144 from the unlocking position toward the locking position (upwardly or from a retracted position to an extended position in FIG. 4D for example), the connector 146 moves the trigger 120 from the unlocked position toward the locked position, or at least permits movement of the trigger 120 from the unlocked position toward the locked position by means of a spring acting on the trigger 120.

Figure 4D:
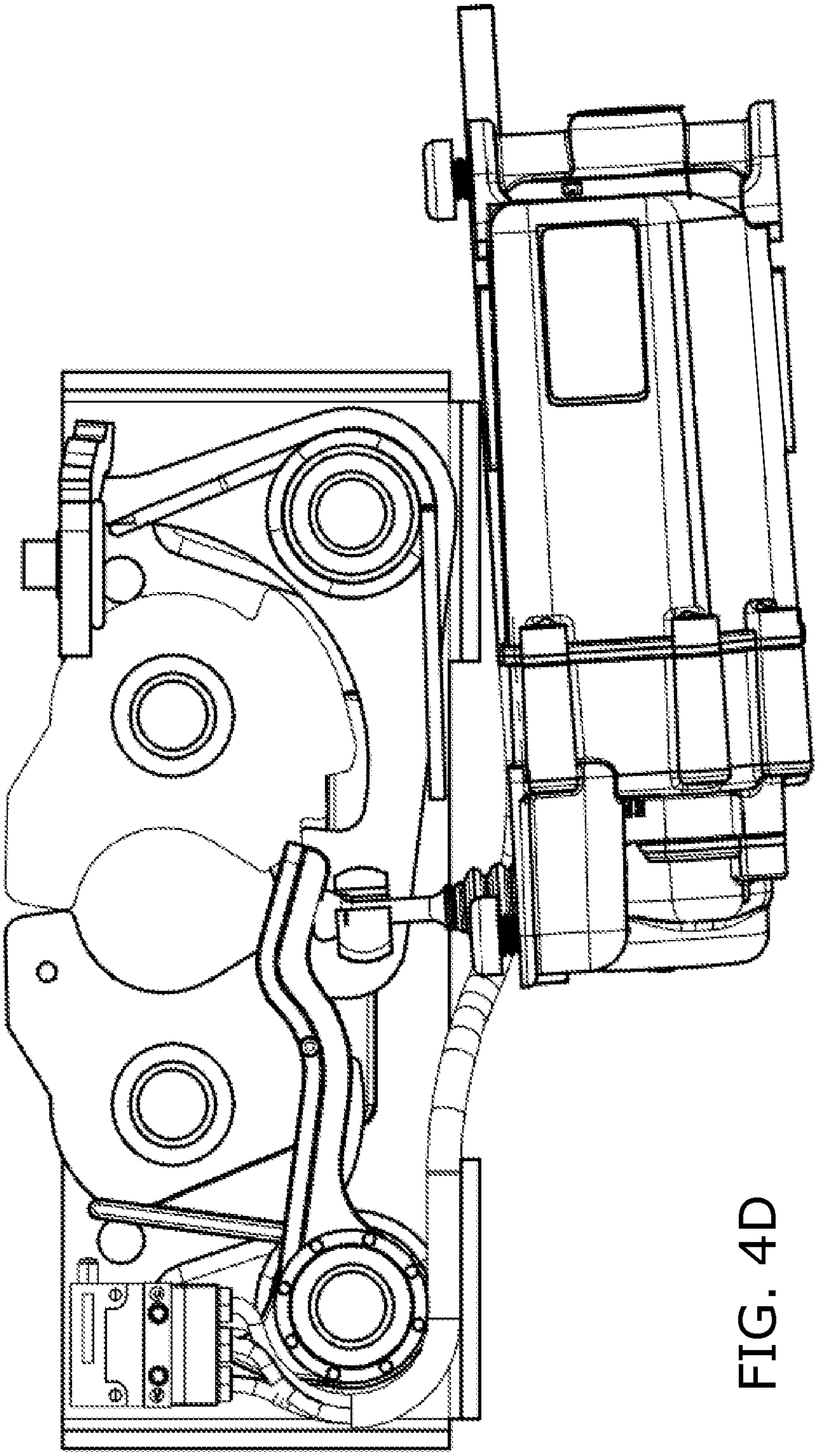
FIG. 4D is a side view of the latch system of FIG. 4A, showing the sensing arm in an over travel position according to an embodiment of the invention.

Conversely, when the connector 146 of the actuator 140 is moved by the motor 144 from the locking position toward the unlocking position (downwardly or from an extended position to a retracted position in FIG. 4D for example), the connector 146 moves or pulls the trigger 120 from the locked position toward the unlocked position.

Further, the connector 146 of the actuator 140 can be moved by the motor 144 to oscillate between the locking position and the unlocking position, in such a way that the axis of the connector 146 may be offset or angled or skew or otherwise oriented from the direction of travel of the connector 146. Specifically, this oscillation is facilitated or accommodated by trigger surface 121 of the trigger insert 122 and the configuration of the trigger insert 122 relative to the connector 146. For example, the angle of the axis of the connector 146 relative to the direction of travel of the connector 146 and/or relative to the orientation of the body of the actuator 140 may change depending on the position of the motor or the extension or retraction of the connector 146. These changes are possible while still maintaining the freedom of movement of the connector 146 relative to the trigger insert 122. Additionally, the trigger surface 121 of the trigger insert 122 can be sized and shaped to allow for movement of the axis of the connector 146 relative to the direction of travel of the connector 146, yet allow for engagement of the connector 146 with the trigger surface 121 of the trigger insert 122. Advantageously, this offset or angled or skew or otherwise orientation of the axis of the connector 146 relative to the direction of its travel allows for freedom of movement, thereby reducing stress applied to and increasing the life cycle of the latch system 100.

Furthermore, the trigger 120 can also be moveable relative to the connector 146 from the locked position toward the unlocked position, while simultaneously keeping the connector 146 in the locking position. For example, manual actuation of the latch to move the trigger 120 from the locked position toward the unlocked position (e.g., by applying a force to the extension of the trigger 120) may occur without movement of the connector 146 by the actuator 140. In this way, the trigger surface 121 of the trigger insert 122 separates from the connector surface 145 of the connector 146, and the trigger insert 122 rides or slides or otherwise moves along the axis of the shaft of the connector 146 and/or moves relative to the connector 146.

Overall, whether moved manually or by operation of the actuator 140, the movement of the trigger 120 from the locked position to or toward the unlocked position permits the latch cam 112 or plural latch cams 112 to rotate from the closed position toward the open position.

Regarding the actuator mechanism, it is optionally composed of a SPDT control switch, a small DC motor, a gear train ending with a drive cam and a trigger/actuator arm. The gear train can be composed of a worm press fit onto the motor output shaft, a worm gear/reduction gear, a compound reduction gear, and the driven gear which includes a drive cam that has two identical lobes spaced 180 degrees apart. Various motor and gear components and configurations can be selected in order to move the connector 146 by engagement with an end portion 148 of connector 146.

Another embodiment of the latch system 100 made according to the present invention is illustrated in FIGS. 4A-4C and 13A-13D. The components of the second embodiment correspond to the first embodiment, except that the second embodiment further includes the sensor assembly 200 (FIG. 4C) mounted to the latch 110. The sensor assembly 200 comprises a sensing arm 132 mounted to the back frame 160 via a pin, such as pin 134 (FIGS. 3A and 4*c*), for rotation about a rotation axis.

Preferably, the sensing arm 132 may be mounted to rotate between a latched position and an unlatched position with the assistance of or via a biasing means, such as spring 136 (FIG. 3A). The sensing arm 132 may be interposed between the striker 190 and a sensor 170 (discussed further below) when the striker 190 is received in the striker-receiving recess 113 (FIG. 4B). The position of the sensor 170 in the latch system 100 advantageously prevents the striker 190 from directly contacting the sensor 170. The decrease in stress to the sensor 170 as applied by the striker 190 due to the offset positioning of the sensor 170 relative to the striker 190 increases the life cycle the sensor 170 despite high frequency use of the latch system 100.

Referring now to FIGS. 13A-13D, the sensing arm 132 includes a striker contact surface 184, which extends radially outwardly relative to the rotation axis and faces toward the striker-receiving recess 113 (FIG. 4B). The striker contact surface 184 contacts the striker 190 when the striker 190 is captured by the latch system 100. When the striker contact surface 184 contacts the striker 190, the sensing arm 132 is in the latched position or is movable toward the latched position by the striker 190; on the other hand, when the striker contact surface 184 of the sensing arm 132 is not in contact with the striker 190, the sensing arm 132 is in the unlatched position or movable toward the unlatched position such as by the spring 136. Accordingly, when the striker contact surface 184 of the sensing arm 132 moves from the unlatched to the latched position, the sensing arm 132 is moved about the rotation axis (clockwise in FIG. 4A) from the unlatched position (FIG. 4A) to or toward the latched position (FIGS. 4B-4C) by the striker 190.

The sensing arm 132 also includes a sensor contact surface 182 extending radially outwardly relative to the rotation axis and angled relative to the striker-receiving recess 113 (FIG. 4B). In particular, the sensor 170 can be mounted adjacent to the sensor contact surface 182 of the sensing arm 132. As seen in FIGS. 4A-4C, relative to the striker 190, the sensor 170 may be positioned offset from a path of the striker 190 as the striker 190 enters the striker-receiving recess 113 of the latch 110. Advantageously, the offset position of the sensor 170 allows for a striker 190 over travel length, which is at least double the length of its activation tolerance length. This allows for easier adjustment of the activation point of the sensor 170 relative to the intended striker 190 position. Advantageously, the protected position of the sensor 170 from the striker 190 allows for a higher life cycle of the sensor 170 despite high frequency use of the latch system 100.

The sensor 170 includes a button 172 movable between an actuated position in which the sensor 170 is actuated (FIG. 4C) and an unactuated position in which the sensor 170 is not actuated (FIG. 4A). The sensor 170 may further comprise a switch (not shown) activated by the button 172 of the sensor 170 when the button 172 is in the actuated position. The switch thereby activates an indicator (not shown), such as a light emitting diode (LED), to illuminate only when the button 172 is in the actuated position. Particularly, the button 172 is in the actuated position when the latch 110 is in the latched position (FIG. 4C). The switch (not shown) may be a normally open circuit or a normally closed circuit. The button 172 of the sensor 170 may have an activation tolerance distance (X) and a travel distance (Y) between the unactuated position and the actuated position, wherein Y 1.5X or wherein Y 2X.

In this way, the sensor 170 can indicate when the striker 190 is received in the striker-receiving recess 113 of the latch 110. Specifically, when the striker contact surface 184 contacts the striker 190, the sensor contact surface 182 releases the button from the unactuated position (fully depressed) to the actuated position (fully released). Further, when the button 172 is in the actuated position (FIG. 4C), the sensing arm 132 is in the latched position and the latch 110 is in the latched position. Conversely, when the striker contact surface 184 is not in contact with the striker 190, the sensing arm 132 rotates (by bias of a spring and in a counterclockwise direction in FIG. 4C), and the sensor contact surface 182 moves the button 172 from the actuated position (fully released) to the unactuated position (fully depressed). When the button 172 is in the unactuated position (FIG. 4A), the sensing arm 132 moves (or is moved) from the latched position to the unlatched position and the latch 110 is in the unlatched position.

Referring now to FIGS. 4A-4C, the movement of the sensing arm 132 from the unlatched position to the latched position, and therefore the movement of the latch 110 from the unlatched position to the latched position, preferably occurs in multiple stages. These stages may comprise the unlatched position (FIG. 4A), an intermediate stage, such as a secondary or partially latched position (FIG. 4B), and a primary stage, such as the latched position (FIG. 4C).

In the unlatched position (FIG. 4A), the sensing arm 132 is in the unlatched position and the latch 110 is similarly in the unlatched position. Specifically, the striker 190 is not in contact with the striker contact surface 184 of the sensing arm 132, thereby allowing the sensor contact surface 182 of the sensing arm 132 to make contact with the button 172 of the sensor 170. Specifically, the sensor contact surface 182 has fully depressed the button 172, thereby maintaining the button 172 in the unactuated position. With the button 172 in the unactuated position, the switch (not shown) of the sensor 170 is not activated.

In the secondary or partially latched position (FIG. 4B), the sensing arm 132 is moving from the unlatched position to or toward the latched position and the latch 110 is likewise moving from the unlatched position to or toward the latched position. In particular, the central region 113 defined by the latch cams 112 partially engages, but does not fully capture the striker 190. In addition, movement of the connector 146 from the unlocking position toward the locking position by the motor 144 permits the trigger 120 to move (by spring bias) from the unlocked position toward the locked position.

Further, the contact between the striker contact surface 184 of the sensing arm 132 and the striker 190 causes the sensor contact surface 182 of the sensing arm 132 to move away from the button 172 of the sensor 170, such that the button 172 of the sensor 170 is not fully depressed. However, because the sensor contact surface 182 remains in contact with the button 172, the button 172 of the sensor 170 is maintained in the unactuated position, thereby maintaining the switch (not shown) of the sensor 170 in the deactivated condition.

In the latched position (FIG. 4C), the sensing arm 132 is in the latched position and the latch 110 is likewise in the latched position. Particularly, the striker 190 is captured within central region 113, as the latch cams 112 are rotated toward the closed position. In particular, movement of the connector 146 toward the locking position by the motor 144 permits the trigger 120 to move toward the locked position, thereby retaining the latch cams 112 in the closed position for capturing the striker 190.

In an over travel position (FIG. 4D), the latch 110 is in the latched position. Particularly, as the striker 190 is captured within central region 113, movement of the connector 146 toward the locking position by the motor 144 permits the trigger 120 to move toward the locked position, thereby retaining the latch cams 112 in the closed position for capturing the striker 190. The sensing arm 132 is configured to be displaced past the minimum distance at which the striker 190 is captured (as in FIG. 4C) when the connector 146 is in the locking position, the trigger 120 is in the locked position, and the latch cams 112 are in the closed position. In other words, whereas the striker 190 is fully captured within central region 113 when the sensing arm 132 is in the latched position, as illustrated in FIG. 4C, the sensing arm 132 is further directed downwardly toward connector 146 in the over travel position. As the sensing arm 132 moves to the over travel position, the latch cams 112 over rotate to allow for the movement of sensing arm 132. Likewise, the motor 144 permits connector 146 and trigger 120 to accommodate the movement of the sensing arm 132. Advantageously, the movement of the sensing arm 132 to the over travel position allows the latch system 100 to absorb at least a portion of the impact from a collision between the striker 190 and the latch 110, thereby reducing stress applied to and increasing the life cycle of the latch system 100.

Additionally, the contact between the striker contact surface 184 and the striker 190 as well as the capture of the striker 190 within the central region 113 allows the sensor contact surface 182 to move away from and fully release the button 172 of the sensor 170. The button 172 is therefore in the actuated position and the switch (not shown) of the sensor 170 is therefore activated when the sensing arm 132 is in the latched position and the latch 110 is in the latched position.

Advantageously, as shown in FIG. 4D, this embodiment allows for the sensor contact surface 182 of the sensing arm 132 to move away from the button 172 as the striker 190 is captured and the latch 110 is in the latched position, such that any over travel of the striker 190 does not negatively affect the sensor 170 (FIG. 4D). Accordingly, the latch assembly 110 is able to withstand severe and high frequency use as the button 172 and the sensor 170 is protected every time the striker 190 is captured and the latch 110 is in the latched position.

Further, the offset position of sensor 170 relative to the path of the striker 190 is advantageous because the reduced or lack of contact between the sensor 170 and the striker 190 leads to less accumulation of dust or debris, thereby increasing the life cycle of the latch system 100. In a non-limiting example, the sensor 170 is not disposed directly underneath the striker-receiving recess 113, as shown in FIGS. 4A-4D.

In addition, the offset position of sensor 170 relative to the path of the striker 190 is advantageous because movement of or contact by the striker 190 against the sensor 170 could cause a false signal. Specifically, as striker 190 enters the striker-receiving recess 113, it can cause a jostling or bumping impact against a contact surface, such as the latch cams 112. If the sensor 170 were positioned to be in direct contact with the striker 190, the jostling or bumping impact caused by the striker 190 can falsely cause the button 172 of the sensor 170 to be in the actuated position. Accordingly, because the sensor 170 is advantageously not in direct contact with the striker 190 in this embodiment, the sensor 170 is protected against a false signal that the latch 110 is in one of the latched or unlatched positions.

FIGS. 4A-4D depict that the sensor is deactivated when the sensing arm is in the unlatched position and the sensor is activated when the sensing arm is in the latched position. However, a person of ordinary skill in the art wound understand from the description herein that the sensor may be deactivated when the sensing arm is in one of the latched position or the unlatched position and activated when the sensing arm is in the other one of the latched position or the unlatched position.

A third embodiment of the latch system 100 made according to the present invention is further disclosed. The components of the third embodiment correspond to those of the first and second embodiments. Specifically, the latch system 100 in this embodiment includes the latch 110, the actuator 140, and the sensor assembly 200.

In another exemplary embodiment of the invention, the latch system 100 includes the latch 110 and the actuator 140. Further, a compartment defines an interior and includes a frame as well as a door movable relative to the frame for selective access to the interior. In this embodiment, the striker 190 of the latch system 100 is mounted to the frame or the door of the compartment. Conversely, the latch 110 and actuator 140 are mounted to the other of the door or the frame of the compartment. For example, the compartment is configured for use in a vehicle to accommodate a passenger or contents of the vehicle.

According to another embodiment of the invention, the latch system 100 includes the latch 110 and the sensor assembly 200. Further, a compartment defines an interior and includes a frame as well as a panel movable relative to the frame for selective access to the interior. The striker 190 of the latch system 100 is mounted to the frame or the panel of the compartment, and the latch 110 and sensor assembly 200 are mounted to the other of the panel or the frame of the compartment. For example, the compartment is configured for use in a vehicle to accommodate a passenger or contents to be transported by the vehicle.

In yet another embodiment of the invention, the latch system 100 includes the latch 110, the actuator 140, and the sensor assembly 200. Further, a compartment defines an interior and includes a frame as well as a panel movable relative to the frame for selective access to the interior of the compartment. In this embodiment, the striker 190 is mounted to the frame or the panel of the compartment. The latch 110, actuator 140, and sensor assembly 200 are then mounted to the other of the panel or the frame of the compartment. For example, the compartment is configured for use in a vehicle to accommodate a passenger or contents to be transported by the vehicle.

Figure 14A:
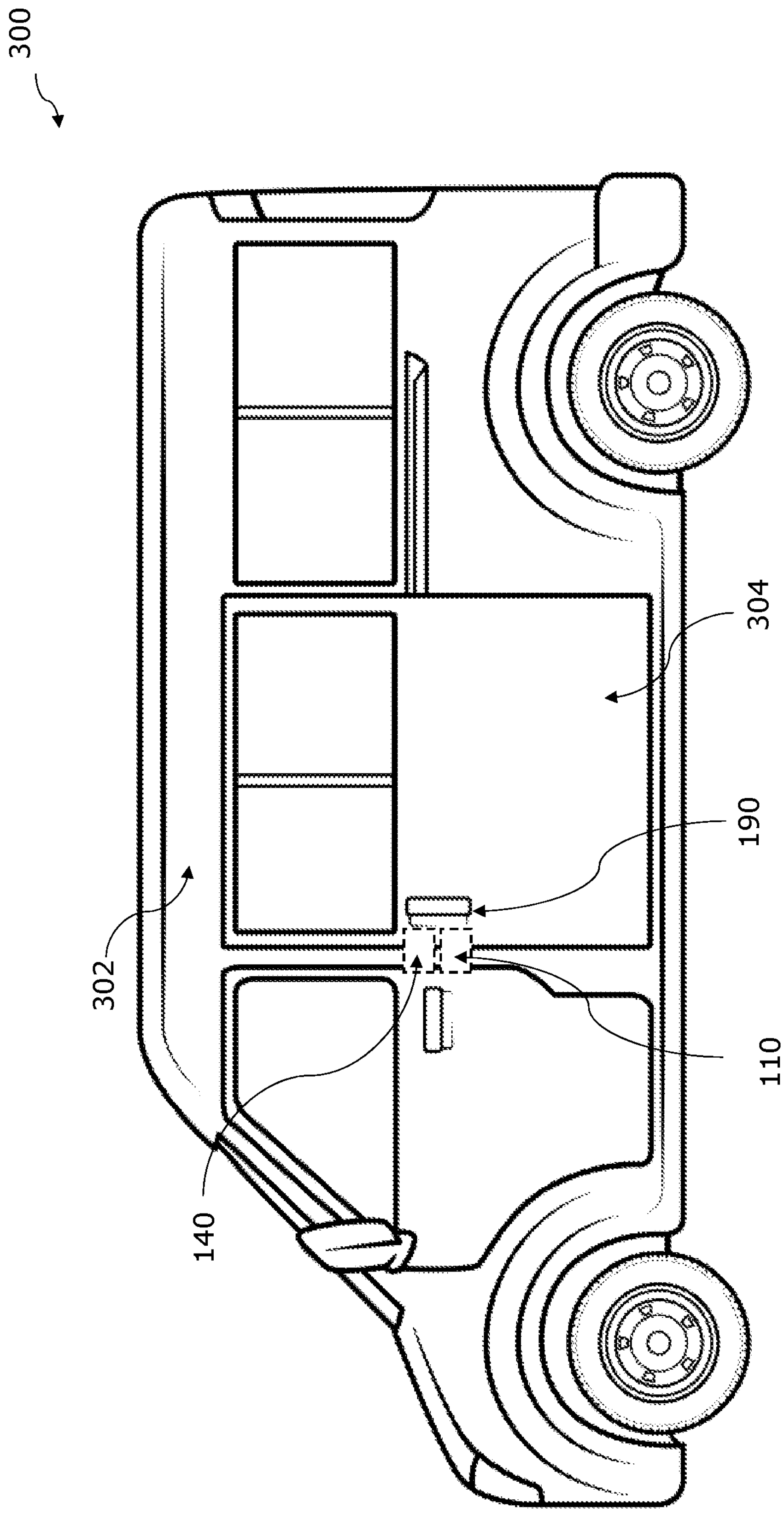
FIGS. 14A-14C each depict a schematic representation of a vehicle, such as a delivery vehicle, including a latch system according to aspects of this invention.

In another exemplary embodiment of the invention, as shown in FIG. 14A, a compartment 300 defines an interior and includes a frame 302 as well as a door 304 movable relative to the frame 302 for selective access to the interior. For example, the compartment 300 can be configured for use in a vehicle to accommodate a passenger or contents of the vehicle. Although FIG. 14A shows the striker 190 of the latch system 100 as being mounted to the door 304, it should be understood that the striker 190 can be mounted to the frame 302 or the door 304 of the compartment 300, without departing from the scope of the invention. Similarly, although FIG. 14A shows the latch 110 and actuator 140 as being mounted to the frame 302, it should be understood that the latch 110 and actuator 140 can be mounted to the other of the door 304 or the frame 302 of the compartment.

Figure 14B:
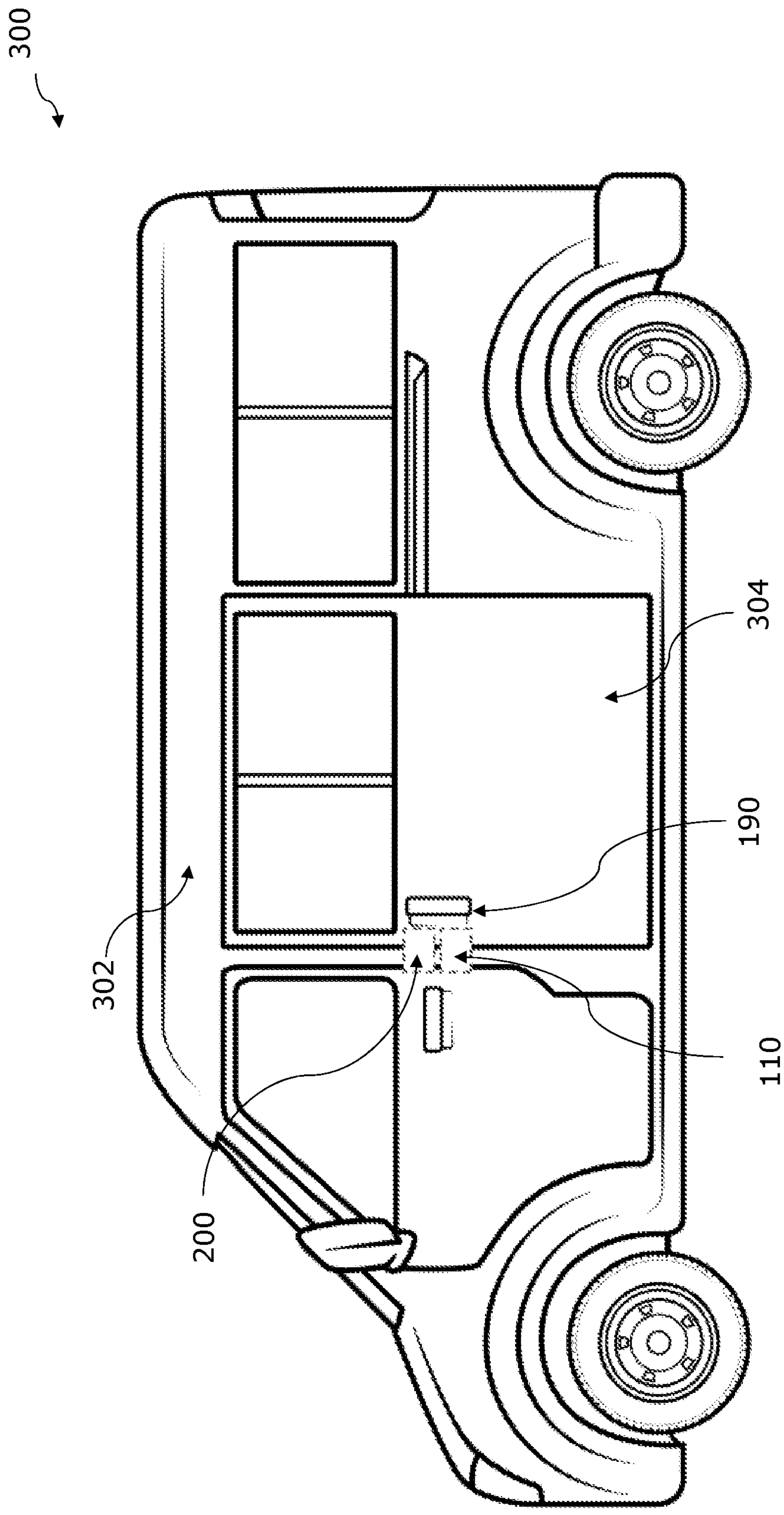

According to another embodiment of the invention, the latch system 100 includes the latch 110 and the sensor assembly 200. As shown in FIG. 14B, the compartment 300 defines an interior and includes a frame 302 as well as a door or panel 304 movable relative to the frame 302 for selective access to the interior. For example, the compartment 300 is configured for use in a vehicle to accommodate a passenger or contents of the vehicle. FIG. 14B shows the striker 190 of the latch system 100 is mounted to the panel 304 of the compartment, and the latch 110 and sensor assembly 200 are mounted to the frame 302 of the compartment 300. It should be understood, however that the striker 190 can be mounted to the frame 302 and the latch 110 and sensor assembly 200 can be mounted to the panel or door 304. One of ordinary skill in the art would understand that one or more of the striker 190, latch 110, and sensory assembly 200 can be mounted to one of the frame 302 and the panel or door 304.

Figure 14C:
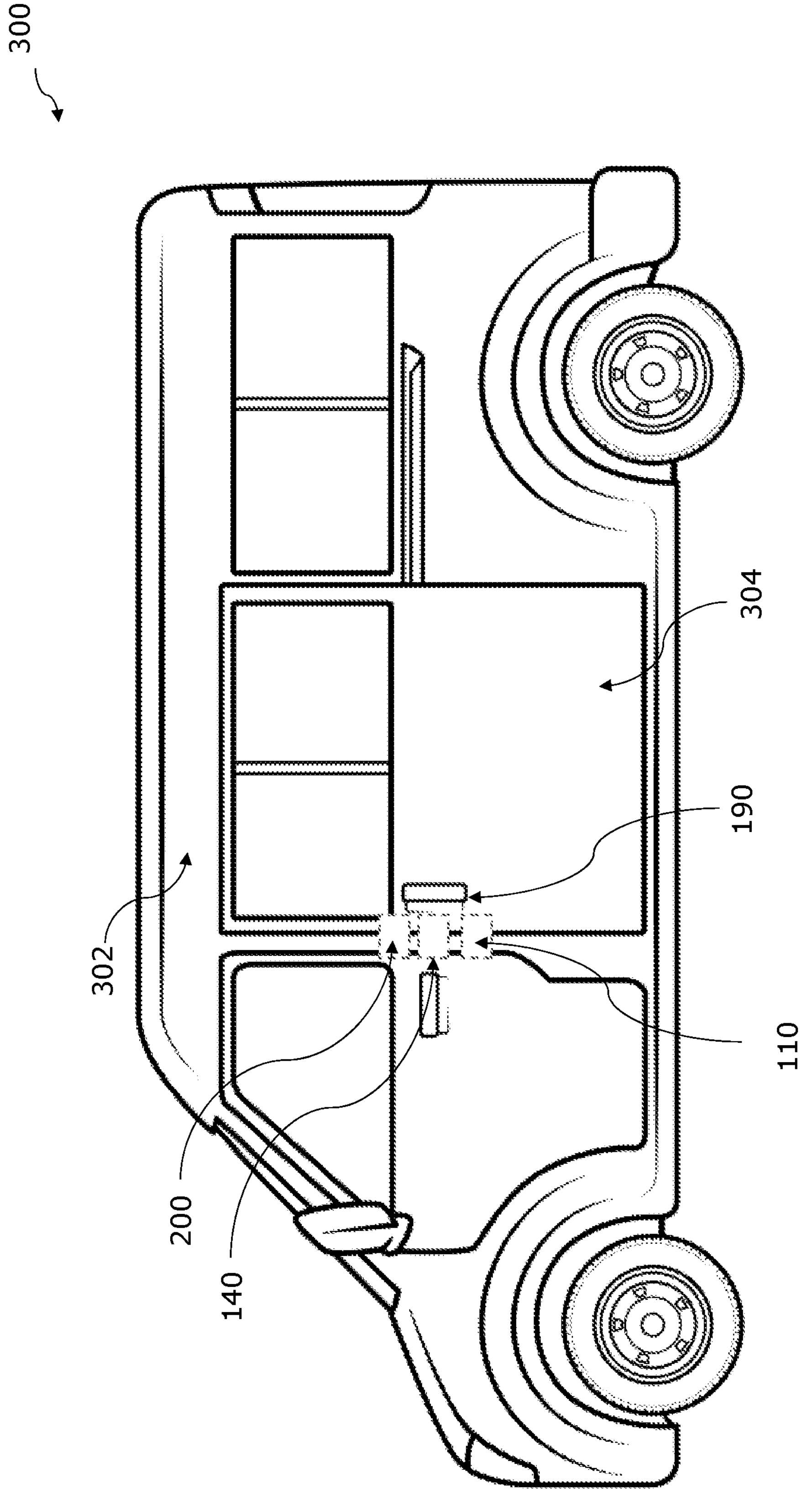

In yet another embodiment of the invention, the latch system 100 includes the latch 110, the actuator 140, and the sensor assembly 200. As shown in FIG. 14C, the compartment 300 defines an interior and includes a frame 302 as well as a panel or door 304 movable relative to the frame 302 for selective access to the interior of the compartment. For example, the compartment 300 is configured for use in a vehicle to accommodate a passenger or contents to be transported by the vehicle. As illustrated in FIG. 14C, the striker 190 is mounted to the panel 304 of the compartment 300. Conversely, the latch 110, actuator 140, and sensor assembly 200 are mounted to the frame 302 of the compartment 300. However, one of ordinary skill in the art would understand that the one or more of the striker 190, the latch 110, the actuator 140, and the sensor assembly 200 can be mounted to one or more of the frame 302 and the panel or door 304. As a non-limiting example, the striker 190 can be mounted to the frame 302 and the latch 110, the actuator 140, and the sensor assembly 200 can all be mounted to the panel or door 304.

Finally, the methods and materials used to fabricate the components of a latch assembly according to the present invention may be any materials known to those having skill in the art. For example, in some embodiments, a stronger, rugged metal material for the latch cam and trigger may be desired to ensure that the latch mechanism will operate properly for a number of cycles during the lifetime of the latch mechanism. For cost reasons, some embodiments may use a cam and/or trigger made from plastic materials. The various components may be stamped from metal or injection molded from plastic, for example.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A latch system for capturing a striker, the latch system comprising:

a latch having:

at least one latch cam mounted to rotate between a closed position and an open position, the at least one latch cam being configured to capture the striker in a central region into which the striker is configured to extend when the at least one latch cam is in the closed position, and a trigger mounted to rotate between a locked position and an unlocked position, the trigger being positioned to contact the at least one latch cam when the trigger is in the locked position, thereby retaining the at least one latch cam in the closed position; and an actuator having:

a connector positionable to engage the trigger, the connector being movable linearly along a connector axis between a locking position and an unlocking position, the connector axis being aligned with the central region, and a motor coupled to the connector and configured to linearly move the connector between the locking position and the unlocking position;

the trigger of the latch being moved from the locked position toward the unlocked position by the connector when the connector of the actuator is linearly moved by the motor from the locking position toward the unlocking position; and the trigger of the latch being moveable relative to the connector of the actuator from the locked position toward the unlocked position when the connector of the actuator remains in the locking position, thereby permitting the at least one latch cam of the latch to rotate from the closed position toward the open position when the connector of the actuator remains in the locking position.

2. The latch system of claim 1, wherein the latch further comprises a housing at least partially enclosing one or more of the trigger and the at least one latch cam.

3. The latch system of claim 2, wherein when the housing at least partially encloses the trigger of the latch, the trigger includes an extension for access from outside of the housing and is configured such that a force applied to the extension urges the trigger toward the unlocked position.

4. The latch system of claim 3, wherein the extension of the trigger of the latch extends outside of the housing.

5. The latch system of claim 1, wherein the trigger of the latch has a trigger surface positioned to be engaged by a connector surface of the connector of the actuator.

6. The latch system of claim 5, wherein the trigger surface is concave and the connector surface is convex, such that the trigger surface generally corresponds to the connector surface and aligns the connector when the connector surface is engaged by the trigger surface.

7. The latch system of claim 6, wherein the connector surface is spherical.

8. The latch system of claim 5, wherein the trigger surface and the connector surface are separable when the trigger is moved from the locked position toward the unlocked position and the connector of the actuator remains in the locking position.

9. The latch system of claim 1, wherein the at least one latch cam comprises a plurality of latch cams, and wherein the plurality of latch cams is each mounted to rotate between the closed position and the open position and together is configured to capture the striker when the plurality of latch cams is in the closed position.

10. The latch system of claim 9, wherein the plurality of latch cams together define the central region into which the striker is configured to extend.

11. The latch system of claim 10, wherein the connector of the actuator is aligned with the central region defined by the plurality of latch cams, thereby maintaining a mechanical advantage as the trigger of the latch is moved from the locked position toward the unlocked position by the connector of the actuator when the connector is moved by the motor from the locking position toward the unlocking position, reducing actuation time, and reducing stress applied to the actuator.

12. The latch system of claim 1, wherein the connector is extended when in the locking position and retracted when in the unlocking position.

13. The latch system of claim 1, wherein trigger of the latch defines an axial aperture, extending along an aperture axis generally corresponding to the connector axis of the connector of the actuator, the axial aperture defined by the trigger receiving the connector.

14. The latch system of claim 13, wherein the trigger of the latch defines a transverse aperture, extending transverse to the aperture axis, through which the connector is inserted into the axial aperture defined by the trigger.

15. The latch system of claim 1, further comprising:

a sensor assembly mounted to the latch, the sensor assembly having:

a sensing arm mounted for rotation about a rotation axis, the sensing arm having a striker contact surface extending radially outwardly relative to the rotation axis, facing toward the striker-receiving recess of the latch, and positioned for contact with the striker when the striker is captured by the latch, the sensing arm also having a sensor contact surface extending radially outwardly relative to the rotation axis and angled relative to the striker contact surface, the sensing arm having a latched position when the striker contact surface of the sensing arm contacts the striker and an unlatched position when the striker contact surface of the sensing arm is not in contact with the striker; and a sensor mounted adjacent the sensor arm, the sensor having a button movable by the sensor contact surface of the sensing arm between an actuated position in which the sensor is actuated and an unactuated position in which the sensor is not actuated;

the sensing arm of the sensor assembly being moved for a predetermined displacement about the rotation axis from the unlatched position to the latched position by the striker when the striker contact surface of the sensing arm contacts the striker, the sensing arm of the sensor assembly being moved past the predetermined displacement about the rotation axis toward an over travel position when the striker contact surface of the sensing arm maintains contact with the striker; and when the sensing arm is in one of the latched position or the unlatched position, the sensor contact surface of the sensing arm maintains contact with the button of the sensor, such that the button of the sensor is in the unactuated position, and when the sensing arm is in the other one of the latched position or the unlatched position, the sensor contact surface of the sensing arm moves out of contact with the button of the sensor, such that the sensor contact surface of the sensing arm does not prevent or resist movement of the button of the sensor toward the actuated position.

16. The latch system of claim 15, wherein the sensor includes a switch activated by the button of the sensor when the button is in the actuated position.

17. The latch system of claim 16, wherein the switch of the sensor has a normally open circuit.

18. The latch system of claim 16, wherein the switch of the sensor has a normally closed circuit.

19. The latch system of claim 15, wherein the sensor indicates when the striker is received in a striker-receiving recess of the latch.

20. The latch system of claim 15, wherein the sensor is offset from a path of the striker as the striker enters a striker-receiving recess of the latch.

21. The latch system of claim 15, wherein the sensing arm is interposed between the striker and the sensor when the striker is received in a striker-receiving recess of the latch, thereby preventing the striker from directly contacting the sensor and AMD increasing a cycle life of the sensor.

22. The latch system of claim 15, wherein the sensor contact surface of the sensing arm moves away from the button as the striker is captured in a striker-receiving recess of the latch.

23. The latch system of claim 15, wherein the sensing arm is in the unlatched position when the striker contact surface of the sensing arm is not in contact with the striker, such that, via the sensor contact surface of the sensing arm, the button of the sensor is in the unactuated position.

24. The latch system of claim 15, wherein the sensing arm is in a partially latched position when the striker contact surface of the sensing arm contacts the striker, thereby causing the sensor contact surface to cause some movement of the button of the sensor but does not cause the button to move from the unactuated position to the actuated position.

25. The latch system of claim 15, wherein the sensing arm is in the latched position when the striker contact surface of the sensing arm contacts the striker, thereby causing the sensor contact surface of the sensing arm to cause movement of the button to the actuated position.

26. A latch system for capturing a striker, the latch system comprising:

a latch having:

a striker-receiving recess, at least one latch cam mounted to rotate between a closed position and an open position, the at least one latch cam being configured to capture the striker in a central region into which the striker is configured to extend when the at least one latch cam is in the closed position, and a trigger mounted to rotate between a locked position and an unlocked position, the trigger being positioned to contact the at least one latch cam when the trigger is in the locked position, thereby retaining the at least one latch cam in the closed position;

an actuator having:

a connector positionable to engage the trigger, the connector being movable linearly along a connector axis between a locking position and an unlocking position, the connector axis being aligned with the central region, and a motor coupled to the connector and configured to linearly move the connector between the locking position and the unlocking position; and a sensor assembly mounted to the latch, the sensor assembly having:

a sensing arm having a striker contact surface positioned for contact with the striker when the striker is captured by the latch system, the sensing arm also having a sensor contact surface, the sensing arm having a latched position when the striker contact surface of the sensing arm contacts the striker and an unlatched position when the striker contact surface of the sensing arm is not in contact with the striker, and a sensor mounted adjacent the sensor arm;

the trigger of the latch being moved from the locked position toward the unlocked position by the connector when the connector of the actuator is linearly moved by the motor from the locking position toward the unlocking position;

the trigger of the latch being moveable relative to the connector of the actuator from the locked position toward the unlocked position when the connector of the actuator remains in the locking position, thereby permitting the at least one latch cam of the latch to rotate from the closed position toward the open position when the connector of the actuator remains in the locking position;

the sensor contact surface of the sensing arm activating the sensor when the sensing arm is in one of the latched position or the unlatched position, and the sensor contact surface of the sensing arm allowing deactivation of the sensor when the sensing arm is in the other one of the latched position or the unlatched position.

27. The latch system of claim 26, wherein the at least one latch cam comprises a plurality of latch cams, the plurality of latch cams is each mounted to rotate between a closed position and an open position and together is configured to capture the striker when the plurality of latch cams is in the closed position.

28. The latch system of claim 27, wherein the plurality of latch cams together defines the central region into which the striker is configured to extend.

29. The latch system of claim 28, wherein the connector of the actuator is aligned with the central region defined by the plurality of latch cams, thereby maintaining a mechanical advantage as the trigger of the latch is moved from the locked position toward the unlocked position by the connector of the actuator when the connector is moved by the motor from the locking position toward the unlocking position, reducing actuation time, and reducing stress applied to the actuator.

30. The latch system of claim 26, wherein the sensor indicates when the striker is received in the striker-receiving recess of the latch.

31. The latch system of claim 26, wherein the sensor is offset from a path of the striker as the striker enters the striker-receiving recess of the latch.

32. The latch system of claim 26, wherein the sensing arm is interposed between the striker and the sensor when the striker is received in the striker-receiving recess, thereby preventing the striker from directly contacting the sensor and increasing a cycle life of the sensor.

33. A compartment defining an interior and including a frame, a door movable relative to the frame for selective access to the interior of the compartment, and the latch system of claim 1, the striker being mounted to the frame or the door of the compartment, and the latch and actuator being mounted to the other of the door or the frame of the compartment.

34. The compartment of claim 33 configured for use in a vehicle to accommodate a passenger or contents of the vehicle.

35. A compartment defining an interior and including a frame, a panel movable relative to the frame for selective access to the interior of the compartment, and the latch system of claim 15, the striker being mounted to the frame or the panel of the compartment, and the latch and sensor assembly being mounted to the other of the panel or the frame of the compartment.

36. The compartment of claim 35 configured for use in a vehicle to accommodate a passenger or contents to be transported by the vehicle.

37. A compartment defining an interior and including a frame, a panel movable relative to the frame for selective access to the interior of the compartment, and the latch system of claim 26, the striker being mounted to the frame or the panel of the compartment, and the latch, actuator and sensor assembly being mounted to the other of the panel or the frame of the compartment.

38. The compartment of claim 37 configured for use in a vehicle to accommodate a passenger or contents to be transported by the vehicle.

* * * * *